Sept. 18, 1951 W. T. GOLLWITZER 2,568,064
PRINTING MACHINE
Filed Nov. 6, 1948 19 Sheets-Sheet 2
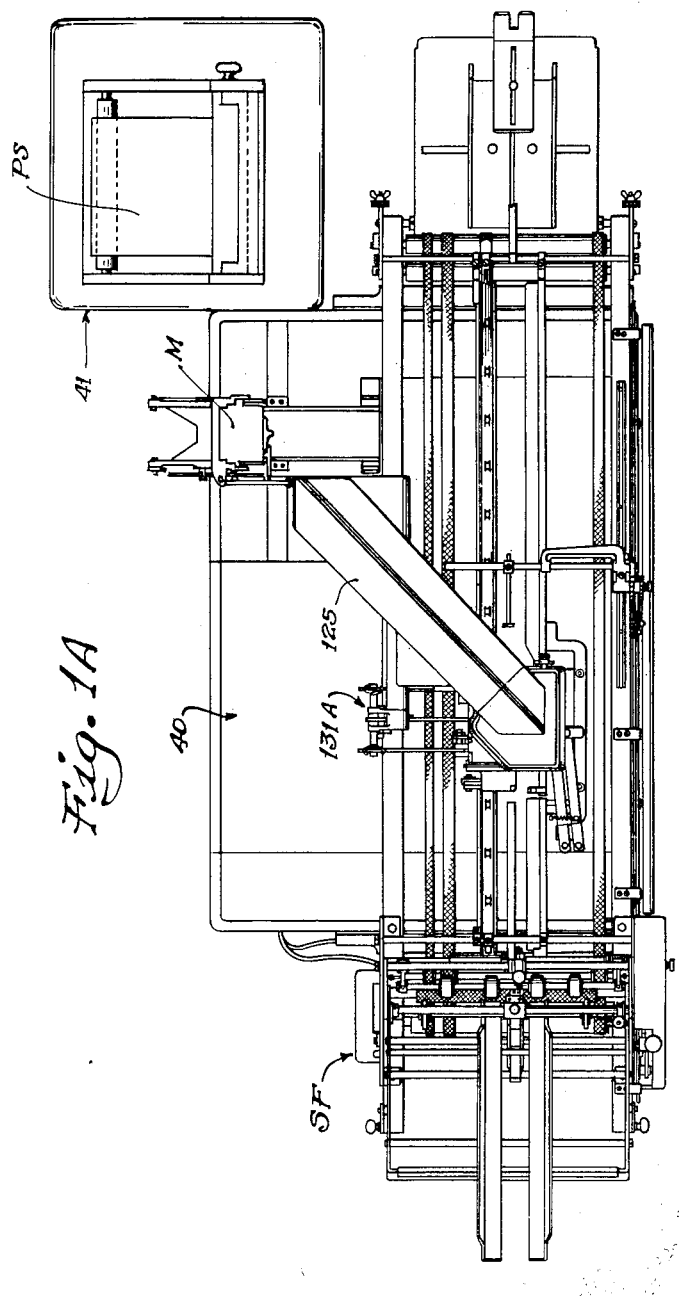
Inventor:
Walter T. Gollwitzer
By Wallace and Cannon
Attorneys

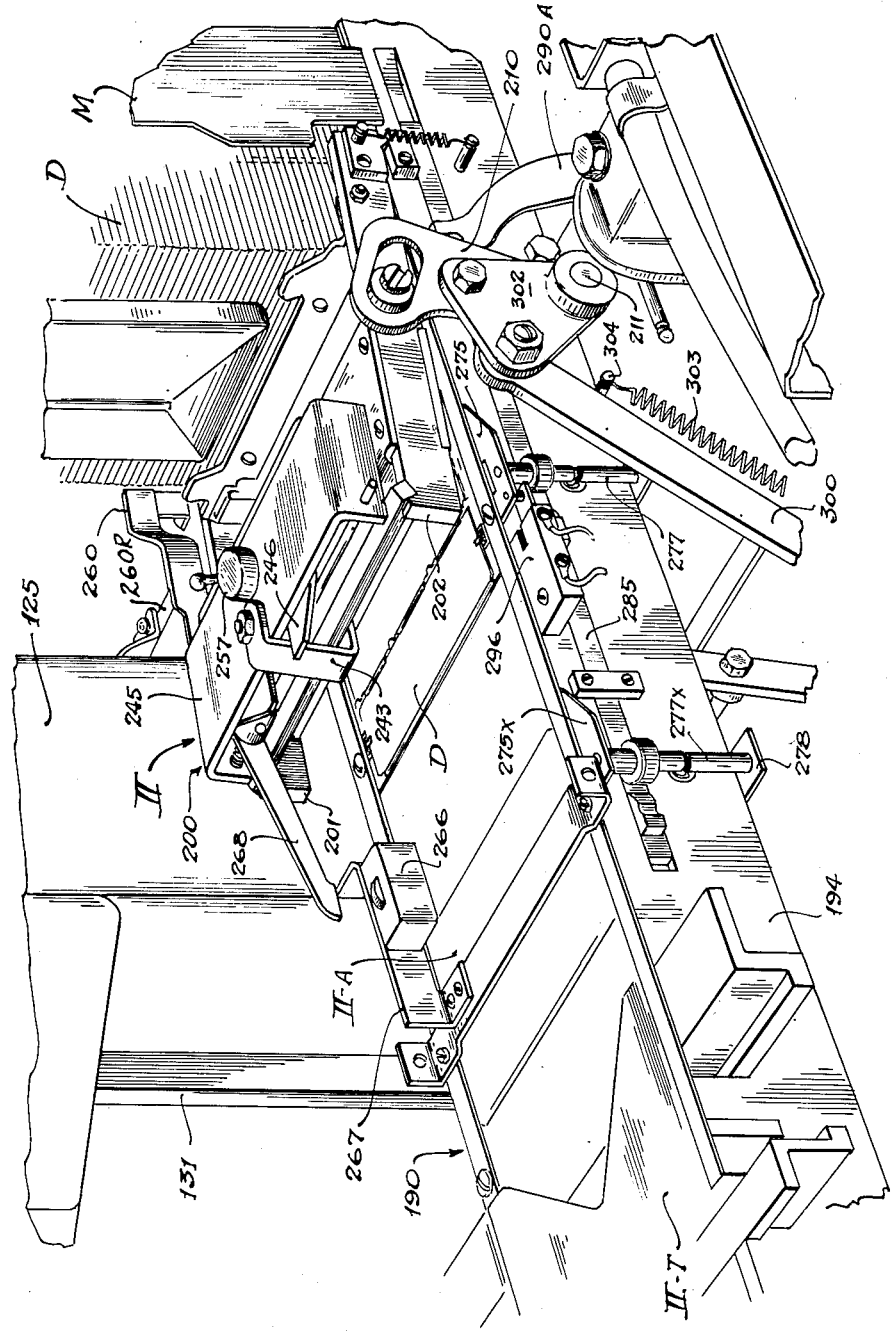

Sept. 18, 1951  W. T. GOLLWITZER  2,568,064
PRINTING MACHINE
Filed Nov. 6, 1948  19 Sheets-Sheet 4

Inventor
Walter T. Gollwitzer
By Wallace and Cannon
Attorneys

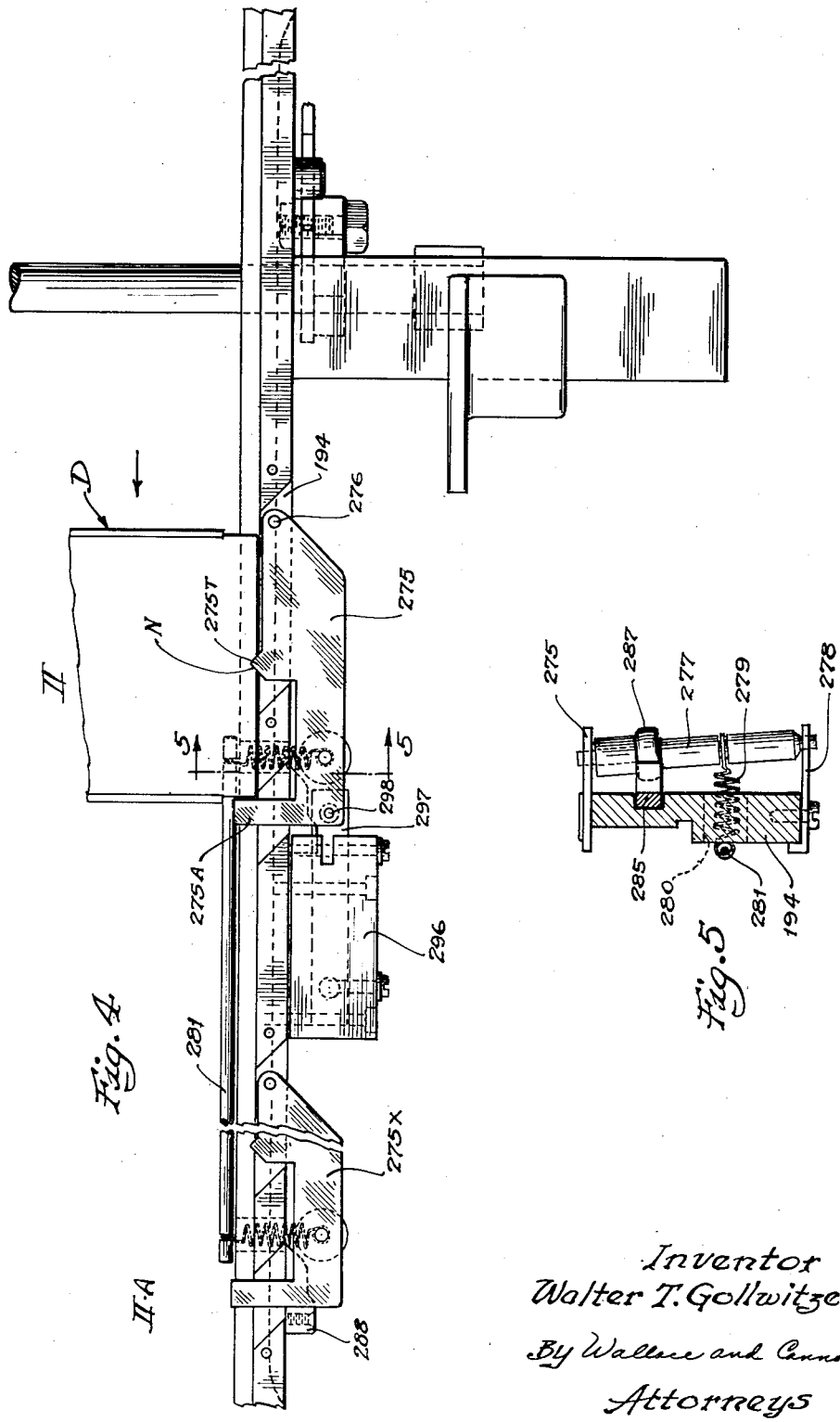

Sept. 18, 1951 — W. T. GOLLWITZER — 2,568,064
PRINTING MACHINE
Filed Nov. 6, 1948 — 19 Sheets-Sheet 6

Inventor
Walter T. Gollwitzer
By Wallace and Cannon
Attorneys

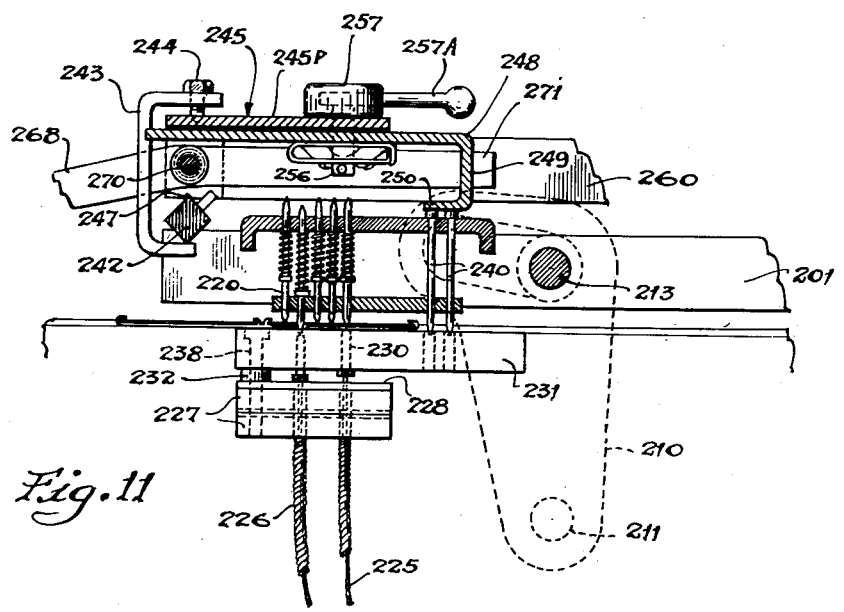

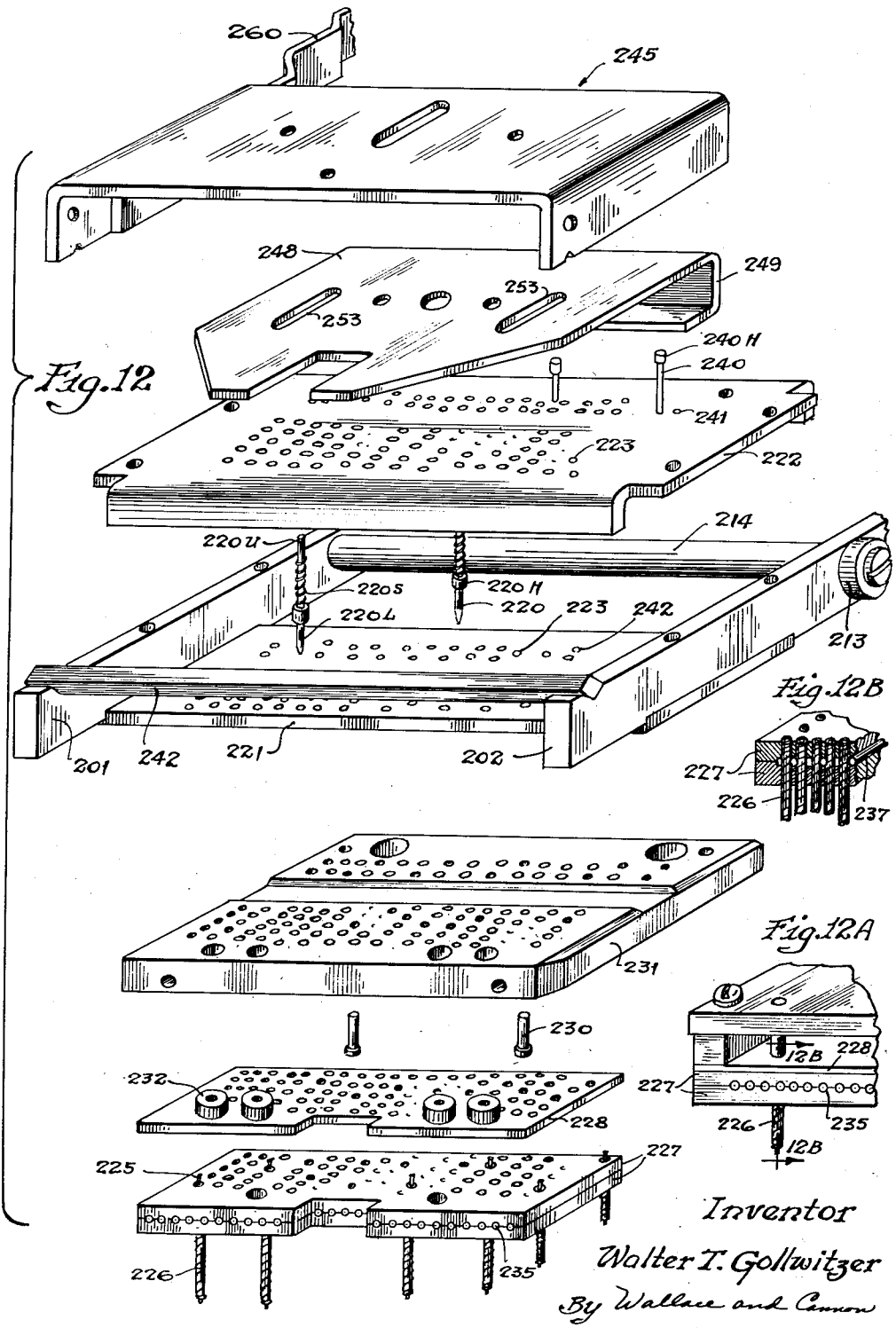

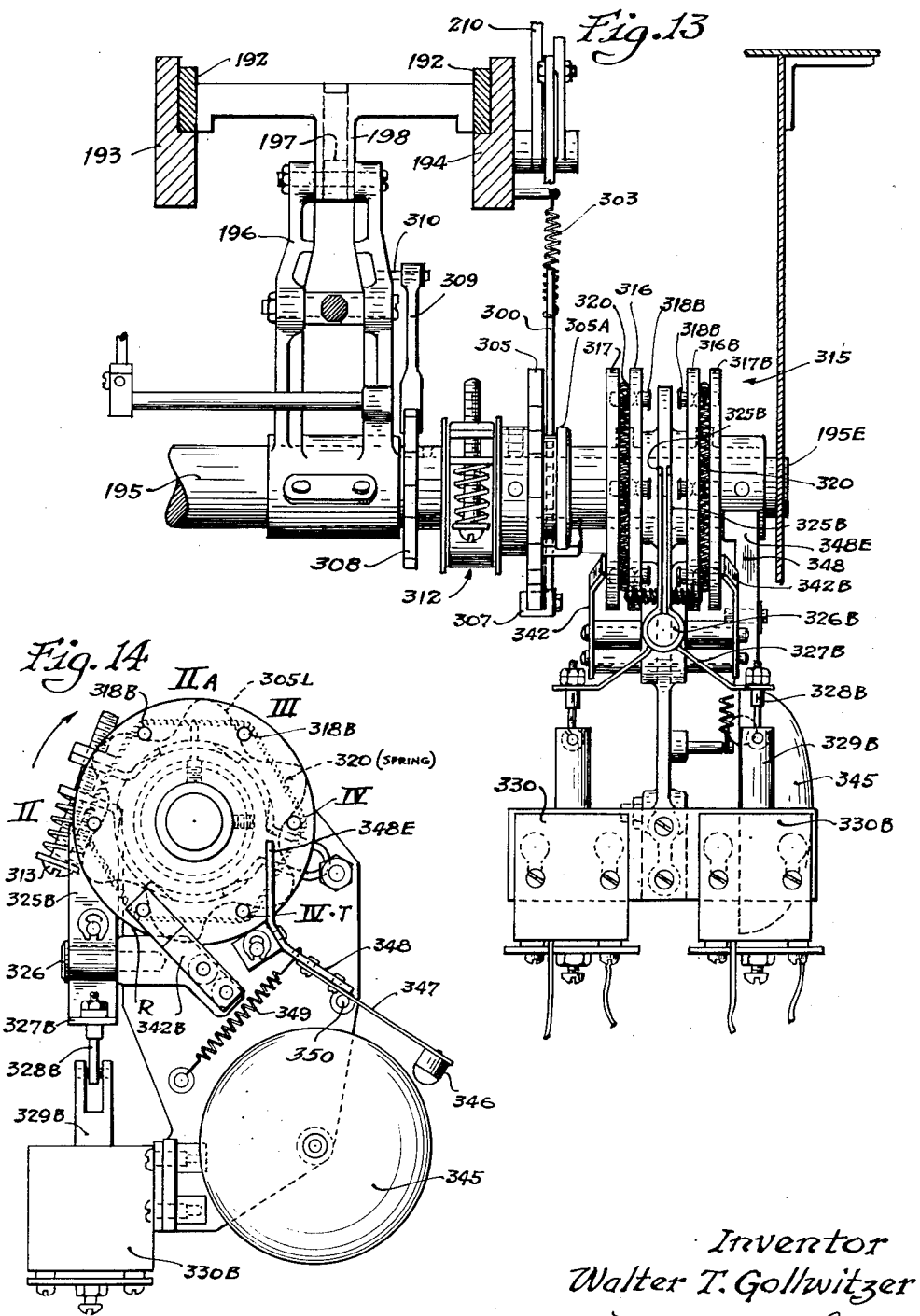

Sept. 18, 1951 W. T. GOLLWITZER 2,568,064
PRINTING MACHINE
Filed Nov. 6, 1948 19 Sheets-Sheet 10
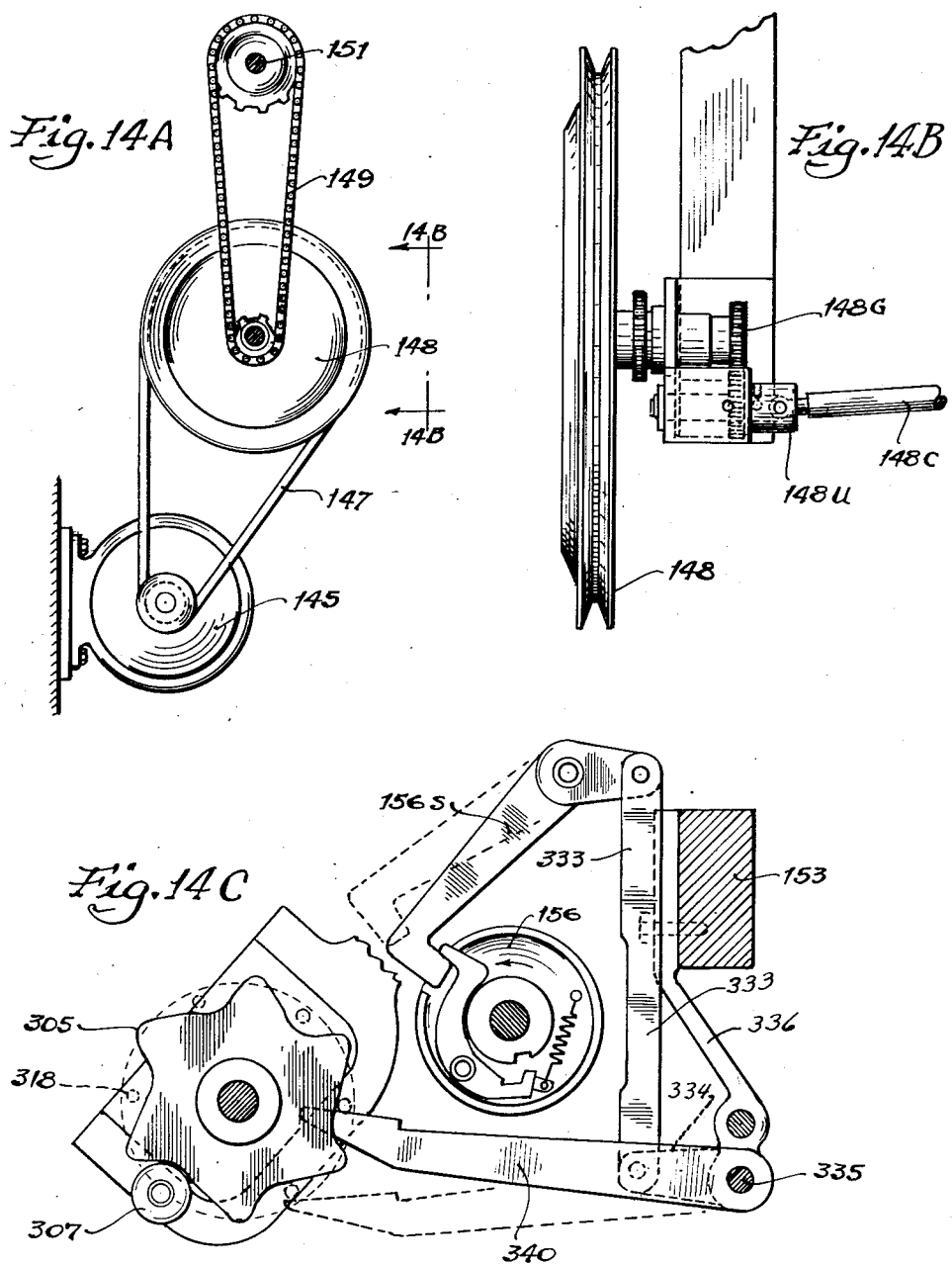

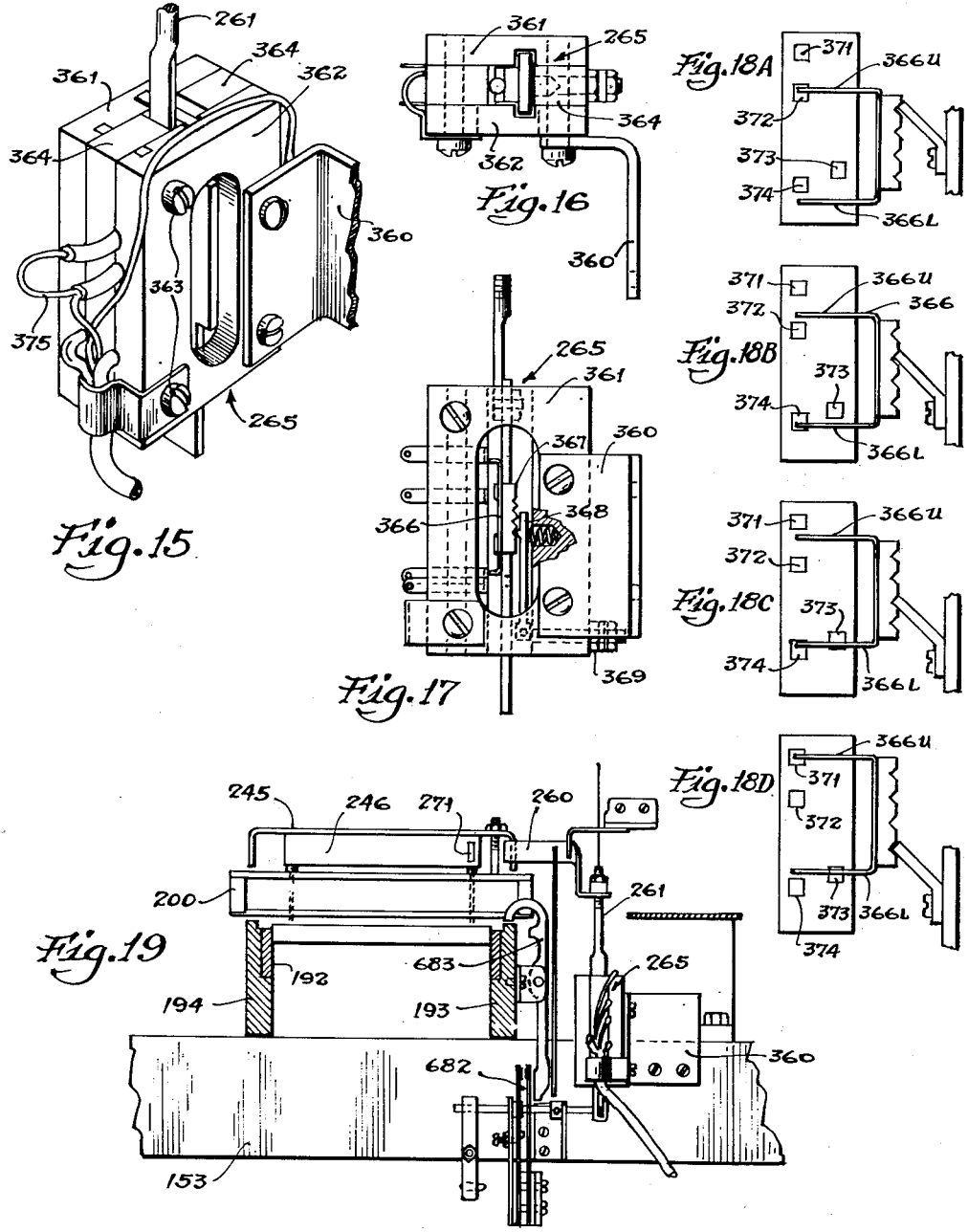

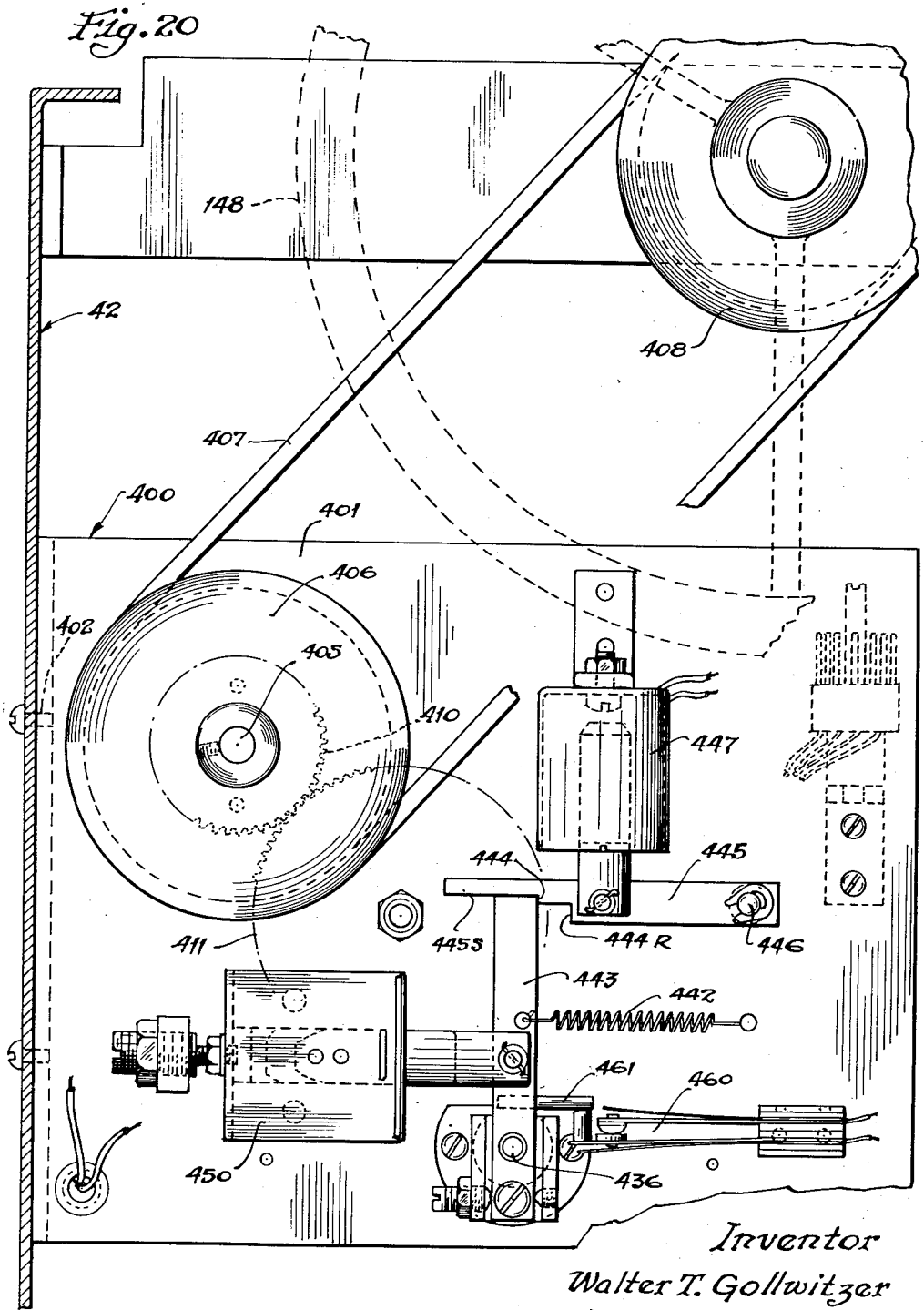

Sept. 18, 1951  W. T. GOLLWITZER  2,568,064
PRINTING MACHINE
Filed Nov. 6, 1948  19 Sheets-Sheet 13

Inventor
Walter T. Gollwitzer
By Wallace and Cannon
Attorneys

Sept. 18, 1951 W. T. GOLLWITZER 2,568,064
PRINTING MACHINE
Filed Nov. 6, 1948 19 Sheets-Sheet 14

Inventor
Walter T. Gollwitzer
By Wallace and Cannon
Attorneys

Sept. 18, 1951 W. T. GOLLWITZER 2,568,064
PRINTING MACHINE
Filed Nov. 6, 1948 19 Sheets-Sheet 15

Inventor
Walter T. Gollwitzer
By Wallace and Cannon
Attorneys

Sept. 18, 1951  W. T. GOLLWITZER  2,568,064
PRINTING MACHINE
Filed Nov. 6, 1948  19 Sheets-Sheet 16
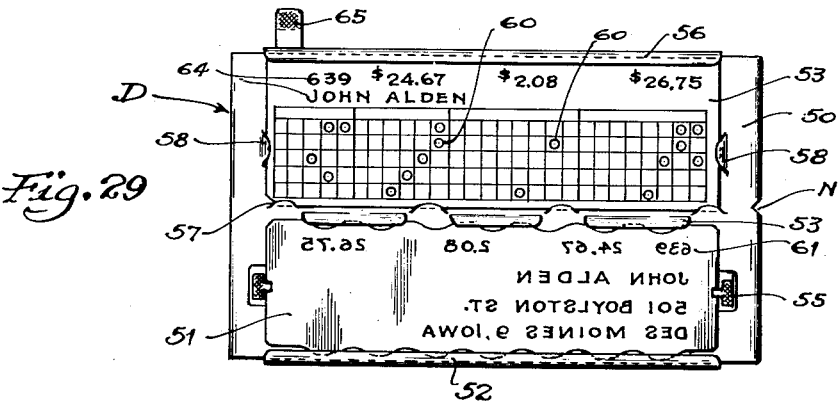
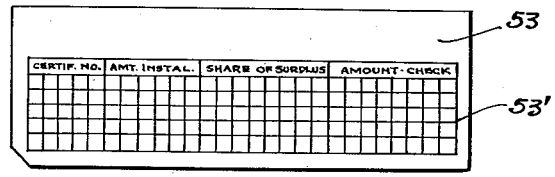
Inventor
Walter T. Gollwitzer
By Wallace and Cannon
Attorneys Sept. 18, 1951 W. T. GOLLWITZER 2,568,064
PRINTING MACHINE
Filed Nov. 6, 1948 19 Sheets-Sheet 17
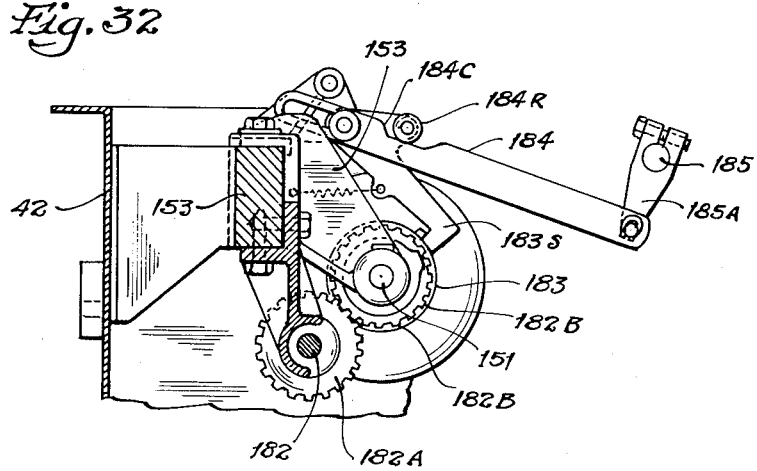
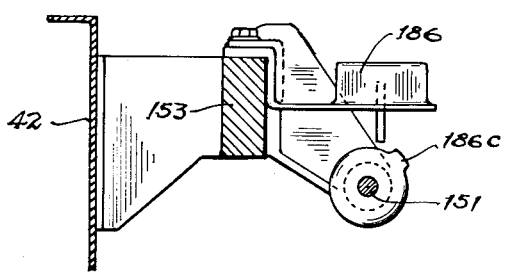
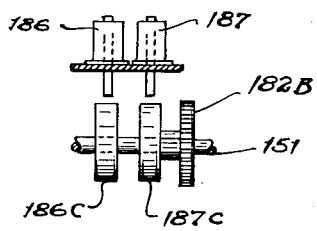
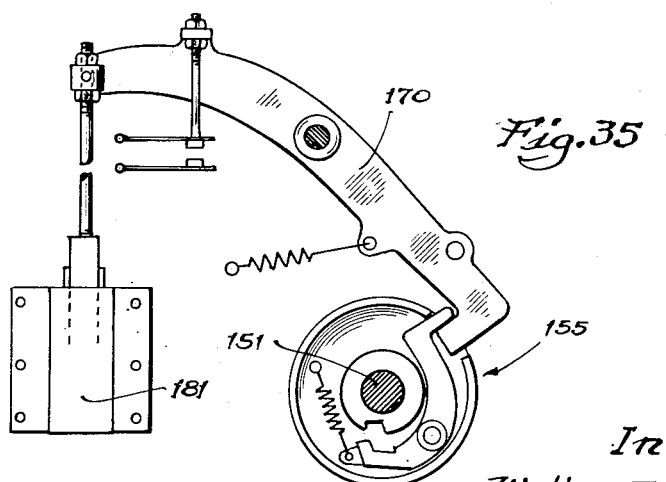
Inventor:
Walter T. Gollwitzer
By Wallace and Cannon
Attorneys Sept. 18, 1951  W. T. GOLLWITZER  2,568,064
PRINTING MACHINE
Filed Nov. 6, 1948  19 Sheets-Sheet 18

Inventor
Walter T. Gollwitzer
By Wallace and Cannon
Attorneys

Sept. 18, 1951  W. T. GOLLWITZER  2,568,064
PRINTING MACHINE
Filed Nov. 6, 1948  19 Sheets-Sheet 19

Inventor
Walter T. Gollwitzer
By Wallace and Cannon
Attorneys

Patented Sept. 18, 1951

2,568,064

UNITED STATES PATENT OFFICE 2,568,064

PRINTING MACHINE

Walter T. Gollwitzer, Euclid, Ohio, assignor to Addressograph-Multigraph Corporation, Wilmington, Del., a corporation of Delaware Application November 6, 1948, Serial No. 58,742

19 Claims. (Cl. 235—61.9)

This invention relates to machines for producing business instruments and particularly to apparatus for producing business instruments that embody printed numerical data with respect to which totals and other accounting information may be desired.

It has been found that business instruments may be advantageously printed from individual printing and control devices through the use of printing machines of the character disclosed in Hueber Patent No. 2,359,849, patented October 10, 1944, particularly when such a printing machine is used in association with automatic sheet feeding mechanism such as that shown in the Morse Patent No. 2,359,852, patented October 10, 1944. Where the apparatus shown in the two aforesaid patents is utilized for producing business instruments such as checks or bills that include numerical or money amounts, it is, of course, highly desirable that means be afforded for conveniently verifying the total amounts of the bills and checks that are thus produced, and to enable this to be accomplished in an advantageous and simple manner is the primary object of the present invention. More specifically, it is an object of the present invention to enable the adding and listing unit disclosed in Figs. 37 to 96 of my copending application, Serial No. 673,329, filed June 12, 1946, now abandoned to be readily and easily coordinated with the apparatus illustrated in the aforesaid Hueber and Morse patents, thereby to enable the adding and listing unit of my aforesaid copending application to produce proof sheets embodying totals of various kinds in accordance with the operation of the apparatus disclosed in the aforesaid Hueber and Morse patents.

In the aforesaid Hueber patent, it is the practice to pass individual printing devices through the machine in succession and to cause the machine to operate through either a print cycle or a skip cycle in respect to each such printing device and in accordance with the sensed presence or absence of identifying means carried on the respective printing devices. In the aforesaid Morse patent, means are illustrated whereby the operation of the automatic sheet feeding mechanism is coordinated with the print-skip operation of the printing machine shown in the aforesaid Hueber patent, and a further object of the present invention is to enable the adding and listing unit of my aforesaid copending application to be coordinated with the print-skip operation of the aforesaid printing apparatus shown in the Hueber patent so that a proof sheet will be produced by the adding and listing unit that corresponds with the money amounts printed on the successive business instruments by the printing mechanism.

Another and important object of the present invention is to afford an improved and simplified sensing mechanism adapted to be used in a machine such as that shown in the aforesaid Hueber patent for sensing the identifying means of the printing devices as well as data-representing perforations that may be afforded in a selected field of such printing devices. More specifically, it is an object of the present invention to afford such a sensing mechanism that is adapted to control the total taking mechanism of the adding and listing units shown in my aforesaid copending application, and to also enable the setting of the sensing means in such a sensing mechanism to be readily and easily effected.

Another important object of the present invention is to enable the adding and listing machine of such an organization to take totals at selected intervals and to enable this to be accomplished under control of the printing machine.

Other and further objects of the present invention will be apparent from the following description and claims and are illustrated in the accompanying drawings, which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1A is a plan view of the machine shown in Fig. 1 and illustrating the sheet feeding means in its normal relation thereto;

Fig. 2 is a fragmentary perspective view illustrating the sensing means of the present invention;

Fig. 4 is a fragmentary plan view of the means for accurately locating the printing devices;

Fig. 5 is a cross sectional view taken substantially along the line 5—5 of Fig. 4;

Figs. 7, 8, 9 and 10 are views showing the details of a locking mechanism embodied in the sensing head;

Fig. 11 is a fragmentary vertical sectional view illustrating details of the sensing head;

Fig. 11A is a view similar to Fig. 11 and illustrating the structure of Fig. 11 in a different relationship;

Fig. 12 is an exploded view of the sensing head showing the details of internal construction;

Fig. 12A is a fragmentary perspective view of the stationary portion of the sensing means;

Fig. 12B is a fragmentary view illustrating the way in which the sheets of the Bowden cables are anchored;

Fig. 13 is a vertical sectional view illustrating the relationship between the storage drum and the printing device feeding means;

Fig. 14 is a view taken from the right in Fig. 13 and illustrating the bell operating mechanism;

Fig. 14A is a schematic view illustrating the drive from the driving motor to the main clutch of the printing machine;

Fig. 14B is a side view illustrating the way in which the drive is transmitted to the adding and listing unit;

Fig. 14C is a schematic view illustrating the way in which the storage drum governs the operation of the platen clutch.

Fig. 15 is a perspective view of the selector switch mechanism;

Fig. 16 is a plan view of the selector switch mechanism;

Fig. 17 is a side elevational view of the selector switch mechanism;

Figs. 18A, 18B, 18C and 18D are diagrammatic views illustrating the selector switch mechanism in its different positions;

Fig. 19 is a view looking in a forward direction in the machine and illustrating the relationship of the selector switch to the sensing mechanism;

Fig. 20 is a side elevational view of the interval control mechanism that govern total taking;

Fig. 28 is a face view of an insurance bill produced by the machine of the present invention;

Fig. 29 is a face view of a printing and control device used in the production of the bill shown in Fig. 28;

Fig. 30 is a detail view of the index card used on the printing and control device of Fig. 29;

Fig. 31 is a view illustrating the code used in placing coded information on the printing and control device of Fig. 29;

Fig. 32 is a fragmentary view illustrating the controlling relationship between the platen mechanism and the timing switches;

Figs. 33 and 34 are fragmentary views illustrating further details of the timing switch arrangement;

Fig. 35 is a fragmentary view illustrating the supplemental solenoid-control of the master clutch of the printing machine.

In the form chosen for disclosure herein, the invention is embodied in a printing apparatus comprising a printing machine 40 having an adding and listing unit 41 operatively associated therewith in such a manner that a proof sheet PS is produced showing the individual amounts printed on documents such as bills, Fig. 28, that are selectively printed from the printing means of printing and control devices D, Fig. 29, that are passed through the printing machine 40. The sheets S may, of course, take different forms such as the individual or separate bills S of Fig. 28 that are passed one by one to the printing station of the printing machine 40, and in such an instance the sheets may be fed into and then out of printing position by means such as the sheet feeder covered by Morse Patent No. 2,359,852, patented October 10, 1944. A sheet feeder SF constructed and related to the printing machine 40 in the manner disclosed in the aforesaid Morse patent is illustrated in Fig. 1A of the drawings in association with the printing machine 40 and the adding and listing unit 41, and reference may be had to such Morse patent for details of a structure and operation thereof. While the invention is herein illustrated and described in a relation where an automatic sheet feeder is employed, it will be recognized that in other instances the impressions made from the printing devices D at printing station of the printing machine may be made in succession on an individual sheet, or on a succession of connected sheets or forms, and in such an instance suitable sheet feeding means may be operatively associated with the printing mechanism. For example, single sheets or groups of sheets and carbons, may be advanced by means such as the lister shown in Hueber Patent No. 2,359,854, patented October 10, 1944.

The adding and listing unit 41 as herein shown is of the construction shown in Figs. 37 to 96 of my copending application Serial No. 676,329, filed June 12, 1946, now Patent No. 2,501,444, and reference may be had to such application for complete details of structure and operation. The adding and listing unit 41 is supported at the right hand end of the frame 42 and somewhat to the rear or near the magazine M, thereby to afford space for association of the sheet feeder SF with the printing machine 40. The adding and listing unit 41 has its drive shaft constantly operated during the operation of the machine, and in such operation, the adding and listing unit produces proof sheets PS bearing the numerical amounts printed on the sheets S and with appropriate totals of such items as will hereinafter be described.

Figure 1:
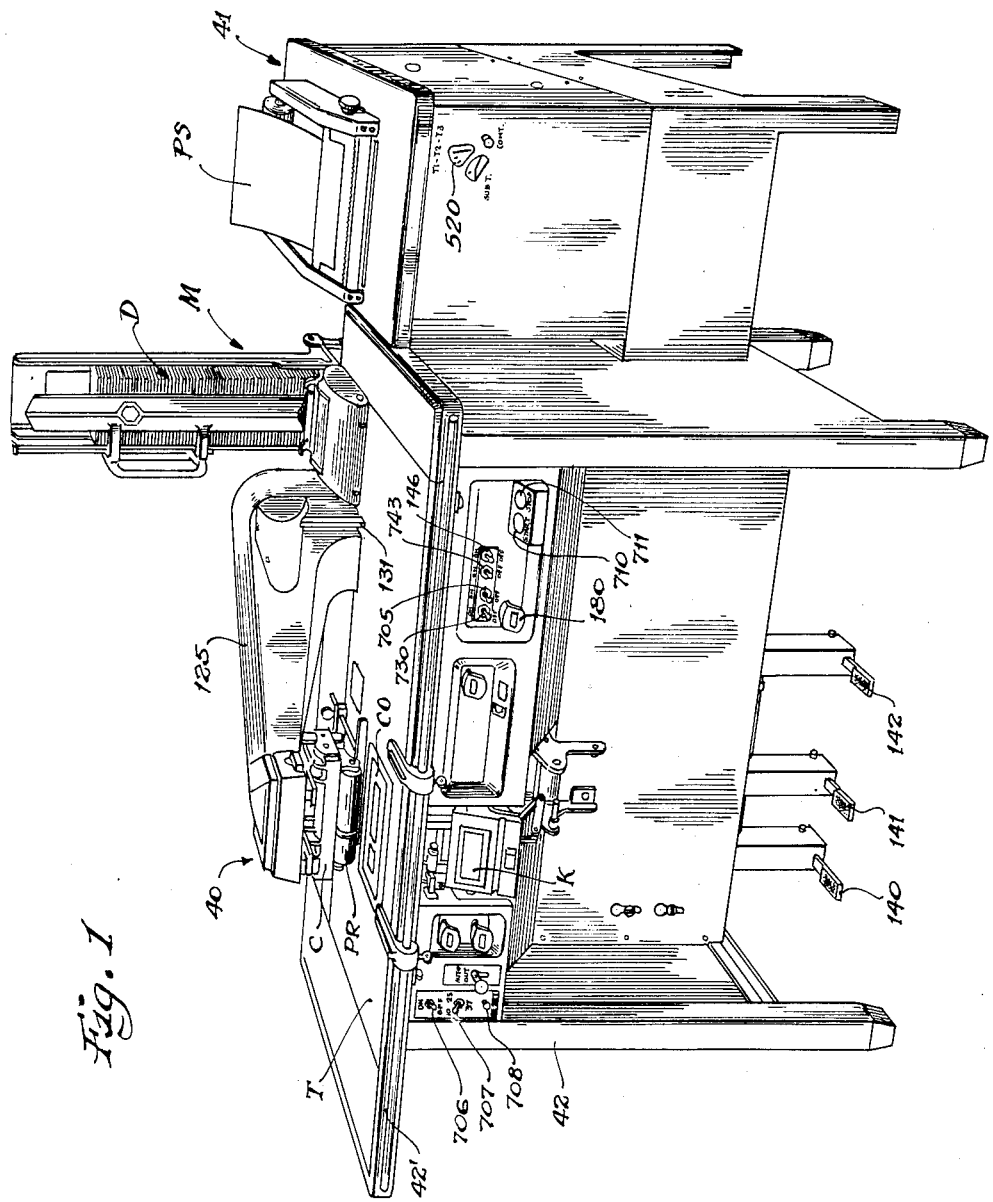
Fig. 1 is a perspective view of a machine embodying the features of the present invention, the machine as shown in Fig. 1 having the sheet feeding means removed therefrom.

While the particular form and arrangement of the printing machine 40 is in many aspects of the present invention immaterial, the particular printing machine 40 that is herein shown is of the type wherein a series of individual printing and control devices D, Fig. 29, each bearing printing means thereon, are advanced one by one from a supply means such as an upstanding magazine M to a printing position provided in the machine. The printing position may in the present instance be considered as being defined in part by an impression means such as the platen mechanism P. The magazine M is supported on a printing machine frame 42 which in the form herein shown is generally desk-like in character so as to provide a table top T upon which sheets, forms and the like may be supported beneath the platen mechanism P for the performance of the printing operations thereon. In the operation of the printing machine 40 the printing devices D are withdrawn one by one from the bottom of the upstanding magazine M and are advanced in a step-by-step manner along a suitable feed path beneath the table top T until each printing device comes to rest at printing position. The printing position is indicated in Fig. 1 of the drawings by a cutoff shield CO disposed beneath the platen P, and it is while the printing device D is at rest at printing position that the platen mechanism P is operated to produce a printed impression from all or selected portions of the type characters embodied in the printing device. After one or more printing operations have been performed thereon or therefrom, the printing device D is further advanced so as to be discharged into a collector means such as a drawer K. The form and construction of the printing machine 40 will be described herein only insofar as it is directly related to the attainment of the selective printing of sheets or bills S and the related control of the adding and listing unit 41, and for further details of the construction and operation of the printing machine 40 reference may be had to Hueber Patent No. 2,359,850, patented October 10, 1944.

*The printing devices*

The printing and control devices D may be of many different types, and the characteristics of the printing device means must of course be related in each instance to the construction and operational characteristics of the printing machine. For use in connection with the printing machine 40 herein shown, a printing device of the character disclosed, for example, in Gollwitzer Patent No. 2,132,412, patented October 11, 1938, may be employed. In other instances, where a different construction and arrangement is provided in the printing machine, a different type of printing device, such for example, as the printing device shown in Gollwitzer Patent No. 1,992,661, patented February 26, 1935, may be employed. In other instances, the present invention may also be utilized with printing machines which employ printing devices of the stencil type wherein a thin sheet of stencil paper is incorporated in a protective carrier or frame. In all of the various kinds of printing devices of this general class, the printing means of each printing device is arranged to embody various classes of data to be printed, and such data is disposed in a plurality of lines disposed one above another upon the operative face of the printing device. As shown in Fig. 29 it will be evident that the several lines of embossed type are formed upon a printing plate 51 which are carried on one face of a frame 50. The printing device D is, in the present instance, provided with a single printing plate 51 which is removably held in position on the operative face of the printing device D by means formed on the frame 50. The printing plate 51 is held in position by a curled lower edge 52 and lugs 53, and spring latches 55 serve to releasably engage notches in the end edges of the printing plate 51 to hold the same in position on the frame 50. Above the printing plate 51, an index and data carrying card 53 is held in place by a curled upper edge 56 on the frame 50 and cooperating lugs 57 and 58. A printed impression as at 64 may be formed on index card 53 from a part of the printing means of the printing device so that the printing device may be readily identified.

The printing and control devices D are each arranged to carry data representations that may be sensed so as to control the adding and listing unit 41, and such data representations in the present instance are afforded by perforations 60 that are formed in the control device D in accordance with the five-element positional code that is illustrated in Fig. 31 of the drawings. Such coded data perforations are formed through the lower portions of the index card 53 which, as will be evident in Figs. 29 and 30, may have a printed form 53 thereon to indicate the nature of the numerical data that are represented by the coded perforations 60. Such coded perforations in the assembly illustrated therein are of such a nature as to conform with the numerical data that are formed by embossing at 61 on the printing plate 51. As shown in Fig. 29, such numerical data are in the present instance so disposed on the printing plate 51 that when an index impression 64 is formed on the index card 53, the printing numerical data will be disposed directly above the corresponding data representations afforded by the coded perforations 60.

The printing devices D are in many instances classified into a relatively large number of groups or classes and such classification may be attained by suitable identifying means provided at selected identifying positions on the printing device D. In the present instance the printing device D shown in Fig. 29 has a plurality of identifying tabs 65 disposed at selected positions along its upper edge in the general manner disclosed in the aforesaid Gollwitzer Patent No. 2,132,412, and in this connection it will be noted that a relatively large number of identifying positions are provided along the upper edge of the frame 50 and that the identifying means or tabs 65 in Fig. 29 are disposed in but selected ones of such identifying positions.

The data which is to be printed from each printing device is, as aforesaid, disposed upon the operative face of the printing device D in a series of lines, and when a printing device such as that shown in Fig. 29 is employed, the type characters may be formed on the printing plates 51 through the use of an embossing machine such as that shown in the patent to Duncan No. 1,518,904, patented December 9, 1924. With such a machine type characters are embossed in the metal of the printing plate 51 so that when a sheet is pressed into operative association with the embossed faces of such type characters a corresponding printed impression is made therefrom. It will be recognized, of course, that the type characters must in every instance be properly inked and this may be properly attained through inking of the type characters prior to the printing operation or through the use of an inked ribbon which is interposed between the type characters and the sheet at the time when the printing impression is made.

The sheet or bill S

In the use of the apparatus of the present invention the numerical elements or portions of the data included in the printing means of a particular printing device D and the related data representations afforded by the coded perforations 60 are effective to attain their respective printing and control functions under the dominating action of the selector mechanism of the machine, and when the tabs 65 on a printing device are so positioned as to cause printing to take place at the printing station, as will hereinafter be described, the bill S is produced in the form shown in Fig. 28. When the tabs 65 are so arranged as to indicate that a printing operation is not desired, the printing device D is passed through printing station in a machine cycle in which the platen P is maintained inoperative.

The printing machine

The printing machine 40 herein illustrated is of the type wherein the impression means is provided by the platen mechanism P, and this platen mechanism is supported in an operative relationship above the table top T by means of a printing frame 125, the specific construction of which is illustrated and described in Hueber Patent No. 2,275,439, patented March 10, 1942. The printing frame 125 is in the present case disposed so as to project upwardly from the table top T at a point located a considerable distance rearwardly and to the right of the printing position, and the printing frame extends forwardly at an angle of substantially 45° with respect to the forward edge 42' of the printing machine frame, thereby to locate the forward end of the printing frame 125 directly above the printing position. The magazine M is located just to the right and somewhat rearwardly of the vertically extending portion of the printing frame 125 and the printing devices D are advanced from the bottom of the magazine M in a forward direction and then along a suitable guide path beneath the table top T and to printing position. The particular arrangement and construction of the printing device feeding path is disclosed in the aforesaid Hueber Patent No. 2,359,850. The printing device advancing means of the printing machine is arranged to advance the printing devices in a step-by-step manner such that each printing device comes to rest at a plurality of different stations along the printing device guideway, and in the machine herein disclosed the first of these stations constitutes a sensing station at which suitable identifying means such as the tabs 65 may be sensed to determine whether or not each printing device D carries such a tab at one or more selected identifying positions thereon, and at this same station and at the same time the data representations 60 are sensed by means forming part of the present invention so as to control the set-up of the adding and listing unit 41. The sensed presence or absence of selected identifying means or tabs on the printing device when the printing device is at sensing station may be rendered operative to control the adding and listing unit 41 as well as to control the operation of the platen mechanism P when the printing device from which the sensed indication is derived reaches printing position. The selector mechanism whereby such controlling action is attained is illustrated in considerable detail and will hereinafter be described as to its specific structure and controlling relation to the platen mechanism, the printing device feeding mechanism, and the adding and listing unit 41, and the other mechanisms of the machine.

The platen mechanism P is herein illustrated as being of the form which is incorporated in the printing machine shown in the aforesaid Hueber Patent No. 2,359,850, and this platen mechanism is described in detail in Hueber Patent No. 2,359,849, patented October 10, 1944. The platen mechanism P comprises a carriage C supported for reciprocation in a direction from front to rear of the printing machine along a guideway provided beneath a head 130 mounted beneath the forward end of the printing frame 125, and a platen roller PR is supported on and carried by the carriage C. The platen roller PR is arranged in a horizontal position at right angles to the path of reciprocation of the carriage C, that is, parallel to the forward edge 42' of the printing machine frame. The platen roller PR is supported by means such as toggles so that the platen roller may be shifted from a normal elevated or inactive position to a lower or active position wherein the platen roller may be effective to press a sheet or form such as the form S into printing cooperation with a printing device disposed at printing position. The platen mechanism P in the form herein disclosed is arranged so that the platen roller is in its elevated or inactive position when the carriage C is at its rearward or at rest position shown in Fig. 1 of the drawings. When a printing operation is to be performed the carriage C is actuated in a forward direction through an idle stroke by means of actuating mechanism indicated generally at 131 and 131A in Fig. 1A of the drawings, and in the course of such forward movement of the carriage C the toggle means are actuated to shift the platen roller PR to its lower or active position. The platen roller PR reaches its lower or active position at substantially the time when the forward stroke of the carriage C has been completed and the toggle means is then latched so as to maintain the platen roller in its lower or active position during the return or rearward stroke of the carriage C. Hence during the rearward or active stroke of the carriage C the platen roller PR may be rolled across the sheet to effect the desired printing operation. As the platen roller approaches the rear end of its stroke and has completed the desired printing operation, it is withdrawn to its elevated or inactive position so that the sheet or form may be readily shifted, or removed and replaced by a new sheet.

In the normal use of a printing machine such as the printing machine 40 the various operative cycles of the printing machine may be initiated by selective manipulation of control means such as a plurality of foot pedals 140, 141 and 142, Fig. 1, which are disposed near the floor beneath the frame 42. The pedals 142 are disposed in or adjacent to the knee-hole opening of the desk-like frame 42 so as to be located for convenient manipulation by an operator seated immediately in front of the adjacent edge of the printing machine frame. The foot pedals 140, 141 and 142 are rendered active by momentary depression thereof, and when thus actuated may serve selectively to initiate different types of single cycle operations of the actuating means which is embodied in the printing machine. This actuating means is fully described in the aforesaid Hueber Patent No. 2,359,850, and reference may be had to this patent for details of construction and operation of the actuating and control means of the printing machine 40.

For purposes of disclosure of the present invention it is sufficient to point out that the printing machine 40 has a driving motor 145, Fig. 34, which as shown in Fig. 34 is energized through a switch 146 located on the forward panel of the printing machine as shown in Fig. 1. The motor 145 serves through suitable speed reducing belt connection 147 to constantly drive a pulley 148, Figs. 20 and 14A, that is mounted on a main drive shaft 151, Fig. 20, in the manner described in the aforesaid Hueber Patent No. 2,359,850, and a chain 149 connects the pulley 148 to a constantly driven sprocket 150 mounted loosely on the shaft 151. The pulley 148 is connected by gearing 148G and a universal joint 148U to a shaft 148S that is connected to the drive gear 245 of adding unit of my aforesaid copending application, thereby to afford a constant power source. The shaft 151 is normally stationary in a rotative sense and is rotated through a single revolution each time the printing machine is to be operated through an active cycle of any kind. Support for the drive shaft 151 is provided by a plurality of bearing brackets 152 carried on a mounting rail 153 which, as shown in Fig. 32, extends parallel to the rear edge of the machine and relatively close to the table top T. The shaft 151 is located in a horizontal position just forwardly of and slightly below the mounting rail 153. As hereinbefore pointed out the drive sprocket 150 is constantly driven and runs loosely or freely on the shaft 151. The drive means or drive paths from the shaft 151 to the various operative mechanisms of the printing machine are arranged for connection to the drive shaft 151 and the drive sprocket 150 in a selective manner as the several mechanisms are to be operated. For this purpose a plurality of clutches are provided on the shaft 151, one of these clutches 155 serving to connect the shaft 151 to the main drive sprocket 150 and the other two of these clutches serve to selectively connect the platen P and the printing device feeding mechanism of the machine to the drive shaft 151. In Fig. 14C of the drawing the platen clutch is fragmentally shown and is identified as clutch 156, and in this view a supplemental stop lever 156S is shown which is effective, as will be hereinafter described, to prevent engagement of the platen clutch 156 when the machine is to operate through an automatic skip or non-printing cycle under control of the selector mechanism. All of these clutches are generally similar in form and construction, and are fully described in the aforesaid Hueber Patent No. 2,359,850, but one of these clutches, identified therein as clutch 250, which serves to connect the driving sprocket 150 to the drive shaft 151, being termed the master clutch, while the other two clutches are respectively termed the feed clutch and the platen clutch.

For present purposes it is sufficient to point out that the feed clutch is controlled in a primary sense by a stop lever which may be shifted to a released position through a linkage which is connected to the foot pedal 140. The feed clutch is operative when it is thus released to assume an engaged relation wherein it serves to operate the printing device feeding means of the printing machine through an operative feeding cycle. The other one of the clutches, that is, the platen clutch, is controlled in a primary sense by a related stop lever which may be actuated to a released position through a linkage connected to the foot pedal 141. As described in the aforesaid Hueber Patent No. 2,359,850, the release of either one of the stop levers of the platen or feed clutch serves through means including a stop lever of the master clutch, to release the master clutch and thereby cause rotation of the drive shaft 151 through a one-revolution cycle.

Since the foot pedal 140 serves only to cause engagement of the feed clutch and to thereby cause a printing device D to be fed through printing position without the performance of a printing operation, this foot pedal 140 is often termed the skip pedal of the machine. The foot pedal 141 serves to cause operation of the platen mechanism only, and for this reason the foot pedal 141 is often termed the repeat pedal. It will be understood that the actuation of the various foot pedals is momentary in character, since it is desirable to permit the normal stop levers to return to their active positions in time to terminate the operation of the machine at the end of one cycle.

The foot pedal 142 is arranged, when momentarily depressed, to cause simultaneous or timed operation of the printing device feeding means and of the platen mechanism P, and, since such operation results in the performance of but a single printing impression from each printing device, the foot pedal 142 is often termed the consecutive pedal of the printing machine. The term "consecutive" as applied to the foot pedal 142 is, however, merely a term of convenience since the printing machine 40 as disclosed in the aforesaid Hueber Patent No. 2,359,850 embodies means whereby the printing device feed may be automatically disabled in certain cycles in a predetermined sequence such that a predetermined number of printing impressions may be made from each printing device.

In the present printing machine, where a sheet feeder SF is used to feed sheets S rapidly into printing position, means are utilized to effect continuous operation of the printing machine and such means also automatically stop the operation of the entire machine when certain undesired conditions are detected. In a manner described hereinafter, continuous operation of the machine is initiated by pressing a switch button 710, Figs. 1 and 36, to close circuit to a solenoid 181, Figs. 35 and 36, which is effective, when energized, to withdraw the stop lever 170 associated with the master clutch 155 to its ineffective position. The solenoid 181 is arranged so as to be energized through a main control and safety circuit, which, as will hereinafter be described, is opened by any one of a plurality of detecting means which may be provided in the machine or by control means which are operated in certain machine cycles.

The continuous operation of the printing machine under control of the main solenoid 181 may be modified in many instances through the dominating action of the selector mechanism of the printing machine 40, such selector mechanism acting through the stop lever 156 of the platen clutch 156 in substantially the same manner as in the aforesaid Hueber Patent No. 2,359,850, but the manner in which the operation of the lever 156S is attained being quite different under the present invention, as will hereinafter be explained. When the selector mechanism is operative there will, of course, be certain cycles of operation of the printing machine wherein the platen mechanism P will remain inactive, so that while the printing machine 40 will maintain its continuous operation under control of the auto-stop means, certain printing devices D will be skipped, and under the present invention the action of the adding and listing unit 41 is correspondingly modified, as will hereinafter be described.

As described in the aforesaid Hueber Patent No. 2,359,850, the sheet feeder SF is operated through a sheet feeding cycle each time the platen P is operated, and the means for accomplishing this are shown in Fig. 32. Thus a shaft 182 that drives and controls the sheet feeder SF is driven by gearing 182A and 182B through a single revolution each time the platen P is operated. The gear 182B constitutes the driven member of a single revolution clutch 183, carried on the main drive shaft 151 and governed by a stop pawl 183S. The pawl 183S is arranged to be disengaged by a link 184, a cam surface 184C and a roller 194R each time the link 184 is moved to the right in Fig. 32, and as described in the aforesaid Morse patent, this is accomplished by a rock shaft 185 and an arm 185A that form part of the platen actuating means.

The shaft 151 is extended beyond the gear 182B, as shown in Fig. 34, and is used to control operation of a pair of timing switches 186 and 187 that are supported on a bracket 189 adjacent to the gear 182B. The switches 186 and 187 are arranged to be closed in each cycle of operation of the main shaft 151 by related cams 186C and 187C that are fixed on the shaft 151.

The selector mechanism

In the operation of the printing machine 41, the printing and control devices D are advanced one by one out of the bottom of the magazine M, and in the first portion of such movement, the printing devices are advanced forwardly along an initial printing device guideway 190, Fig. 2, into a sensing station II, then to an idle station IIA, and then into a first transfer position IIT in substantially the same manner described in the aforesaid Hueber Patent No. 2,359,850. It should be noted, however, that as herein shown, the magazine M and the sensing station II are set rearwardly of the positions shown in such Hueber patent, and the idle station IIA has been added. Such advancing movement of the printing devices is accomplished through operation of reciprocating carrier bars 192, Fig. 13, that are mounted for reciprocation in spaced supporting rails 193 and 194 that form the initial printing device guideway 191. Such operation or reciprocation of the carrier bars 192 is accomplished by means somewhat similar to the means described in the aforesaid Hueber patent, and such means include a rock shaft 195, Fig. 13, an arm 196, Figs. 3 and 13, fixed on the shaft 195, and a block 197 mounted pivotally on the upper end of the arm 196 and arranged to slide vertically between a pair of arms 198 that are provided on the carrier bars 192. This affords a scotch-yoke connection, which will clear the data transmitting cables that extend from the data-sensing means as will hereinafter become apparent.

In a first reciprocation of the carrier bars 192, the lowermost printing device D in the magazine M is advanced forwardly to a sensing station II, which is afforded in the printing device guideway 190 and which is defined in part by a sensing head 200 that is mounted over the guideway 190 for downward movement into sensing cooperation with the identifying means of tabs 65 and the data representations or perforations 60 of each printing device D as this printing device comes to rest at sensing station.

The sensing head 200 comprises a pair of rigidly connected parallel arms 201 and 202 that are disposed over the respective rails 193 and 194 just forward of the magazine end, and at their rear ends the arms 201 and 202 are pivotally related to the rails 193 and 194. Such pivotal mounting is afforded by means that are of a knife-edge connection as will be evident in Figs. 2 and 3. Thus, each of the rails has a stationary bearing block 205 mounted thereon and each such block has a V-shaped groove extending transversely thereacross. Each of the arms 201 and 202 has a bearing block 206 and each such bearing block has a downwardly projecting tooth extending thereon from the bearing block to afford the desired knife-edge bearing. Springs 207 acting between the bearing blocks and the respective rails 193 and 194 serve to hold these knife-edge bearings in operative engagement with each other.

The sensing head 200 is arranged to be moved downwardly from the normally elevated position shown in Figs. 2 and 3 in each cycle of operation of the carrier bars 192, as will hereinafter be explained in detail, and the means for imparting such downward sensing head 200 includes a pair of cam plates 210 fixed on opposite ends of a rock shaft 211 that extends through the rails 193 and 194 as will be evident in Fig. 3 of the drawings. The cams 210 each have a slot 212 formed therein to engage a roller 213 on the adjacent side of the sensing head 200. Such rollers 213 are fixed on opposite ends of a mounting shaft 214, Fig. 12, which extends between the arms 201 and 202 and constitutes a part of the structure that maintains these two arms in a rigid relationship. The form of the cam slots 212 is such that when the rock shaft 211 is rocked in a forward or counter-clockwise direction, the sensing head 200 is moved in a downward direction through the desired sensing structure.

Figure 3:
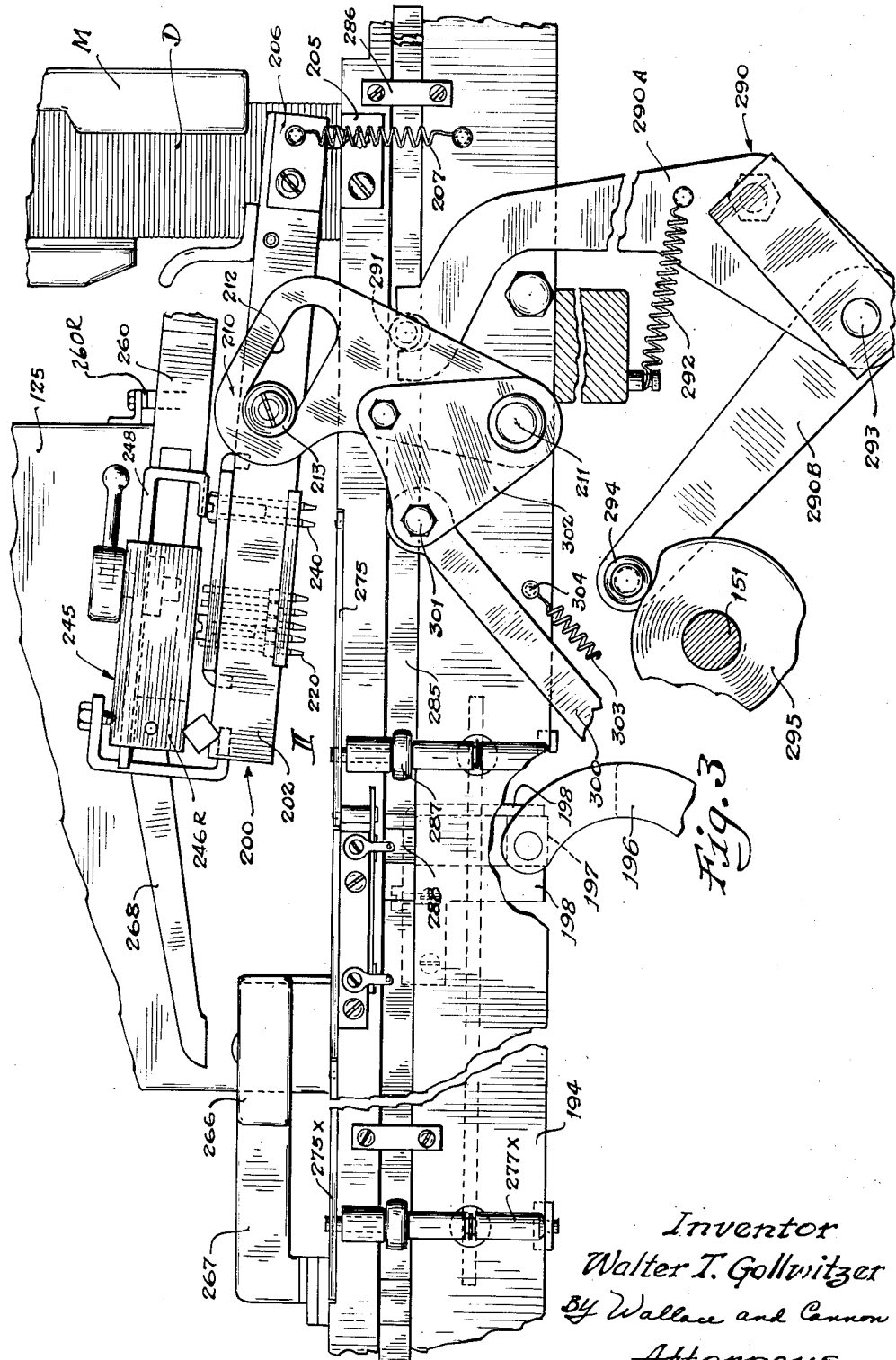
Fig. 3 is a fragmentary side elevational view of the sensing means.

The sensing head 200 is arranged to carry means operable to sense the data representations afforded by the perforations 60 in the printing and control devices D, and for this purpose a plurality of sensing pins 220, Figs. 3 and 12, are provided on the sensing head with one such pin disposed in each position at which a perforation 60 may appear. In providing a mounting for such sensing pins 220, the sensing head 200 is provided with a lower mounting plate 221 secured as by screws to the lower edge of the arms 201 and, as shown in Fig. 12 of the drawings, an upper mounting plate 222 is also afforded which is fixed across the upper edges of the arms 201 and 202 by means of screws as will be evident in Figs. 3 and 12. The several sensing pins 220 are mounted and guided in aligned guide perforations formed in the upper and lower mounting plates, and as will be evident in Fig. 12, each sensing pin 220 has a lower portion 220L that extends downwardly through the guide perforation in the lower mounting plate 221 and an upper guide portion 220U that extends through the aligned guide perforation in the upper guide plate 222. Near its lower end and the defining boundary between the upper and lower portions of the pin, each pin has a head 220H, and a spring 220S surrounds the portion 220U of the pin so as to act between the head 220H and the upper mounting plate 222 so as to thereby urge the sensing pin downwardly to a lower position that is determined by the engagement of the head 220H with the upper face of the lower mounting plate 221.

When the sensing head 200 is moved downwardly through a sensing stroke, the several sensing pins 220 come into contact with the index cards 53 at each one of the several index positions at which a data representing perforation 60 may appear. Where a pin 220 does not encounter such a perforation, the further downward movement of the sensing head 200 will result in compression of the spring 220S of that sensing pin. Where, however, a sensing pin 220 is aligned with a data representing perforation 60, the sensing pin 220 will pass through such perforation and will be effective to actuate means that govern the set-up mechanisms of the adding and listing unit 41. In the present instance, such a controlling action is attained through actuation of Bowden cables 225 that serve as a transmitting connection for selectively raising the set-up control pins 152 that are afforded in the adding and listing unit 41 as described in my aforesaid copending application, Serial No. 676,329, and the Bowden cables 225 that are herein shown correspond with the Bowden cables 154 of such application.

In arranging the pins 220 for cooperation with such connecting means, the Bowden cables 225, Fig. 12, are associated with the sensing head 200 in such a manner that accuracy of operation is facilitated. Thus, as shown in Figs. 11 and 12, the sheaths 226 of the Bowden cables 225 are anchored in a pair of plates 227 and the Bowden cables 225 extend upwardly through the uppermost plate 227 and through a cap plate 228. Above the cap plate the ends of the respective Bowden cables 225 are extended into the headed lower ends of plungers 230 that extend slidably upwardly through an upper guide plate 231. The plate 228 rests directly on the upper face of the upper plate 227, while spacers 232 are disposed between the plate 228 and the upper guide plate 231. Thus, the pins 230 may move vertically from normal or restored upper position wherein the heads of the pins 230 are engaged with the lower face of the plate 231 to lower or actuated positions wherein the heads of the pins 230 are engaged with the upper face of the plate 228. When the Bowden cables 225 have been restored by the restoring mechanism that is incorporated in the adding and listing unit, the pins 230 all occupy their upper positions, wherein the upper ends thereof are flush with the upper face of the plate 231. In anchoring the sheets 226, the two plates 227 have aligned vertical bores formed therein to receive the several sheaths, and horizontal bores 235 are formed so as to extend along the opposed parting faces of the plates 227, as will be evident in Fig. 12. These bores 235 are so disposed that they partially intersect the vertical bores through which the sheaths 226 extend, and anchoring pins 237 may thus be driven into the bores 235 to engage the side surfaces of the sheaths 226 to hold such sheaths against longitudinal displacement. The entire assembly afforded by the plates 226, 227 and 231 is held together by anchoring bolts 238, Fig. 11, and this assembly is fixed in a rigid relationship between the two rails 193 and 194 so as to be in proper alignment with the cooperating sensing pins 220.

The sensing head 200 also embodies means for sensing the identifying tabs 65 of the printing devices D, and this means includes a plurality of sensing pins 240 that may be extended downwardly through openings 241 and 242 formed respectively in the guide plates 222 and 221. The sensing pins 240 have heads 240H at their upper ends that rest on the upper surface of the plate 222, and in a downward sensing stroke of the sensing head 200, the pins 240 may encounter a tab 65 on a printing device D that is disposed in sensing position. It will be observed in Figs. 3 and 11 of the drawings that two sensing pins 240 are provided so that they are spaced in a front to rear direction, and this is done so that these pins may be utilized for cooperation with what are termed perforated tabs 65 which may have four and sometimes five perforations in each tab. This use of perforated tabs serves to increase the number of classifications that may be imparted to the printing devices through the use of tabs on such printing devices, but it will be observed that these pins 240 may be utilized with either perforated solid or notched tabs as is well understood in the art. When a sensing pin 240 engages a tab 65, or an unperforated area of such a tab, the continued downward movement of the sensing head serves in effect to cause relative upward movement of the sensing pin, and this relative upward movement is utilized to impart controlling movement to means that are mounted on the sensing head 200. Thus the sensing head 200 has a transverse mounting bar 242 fixed thereon as will be evident in Figs. 2, 3 and 11, and on its upper edge, the bar 242 has a rocker 245.

The rocker 245 is in the form of a plate 245P having down-turned edge flanges 246R and 246L at its opposite end edges. These flanges 246R and 246L have notches 247 in their forward portions that rest on the corner afforded by the mounting bar 242. A retaining clamp 243 has one arm that engages the lower edge of the bar 242 and another arm having a bolt 244 therein engaging the plate 245P, and this arrangement serves to hold the notches 247 in engagement with the bar 242. The plate 245P serves as a carrier for an abutment slide 248 that has a downwardly extended flange 249 at its rear edge as viewed in Fig. 11. At the lower edge of the flange 249, a forwardly projecting horizontal flange 250 is afforded which overlies the heads 240H of the pins 240. Thus, when one of the pins 240 engages a tab, the continued rocking movement of the sensing head 200 causes the rocker 245 to be rocked in a counterclockwise direction about the pivot afforded by the notches 247. In other words, the rear or right-hand edge of the rocker 245 is in effect elevated when a tab 65 is thus sensed, and this relative rocking movement of the rocker 245 is utilized in causing the print-skip control of the printing machine.

Figure 6:
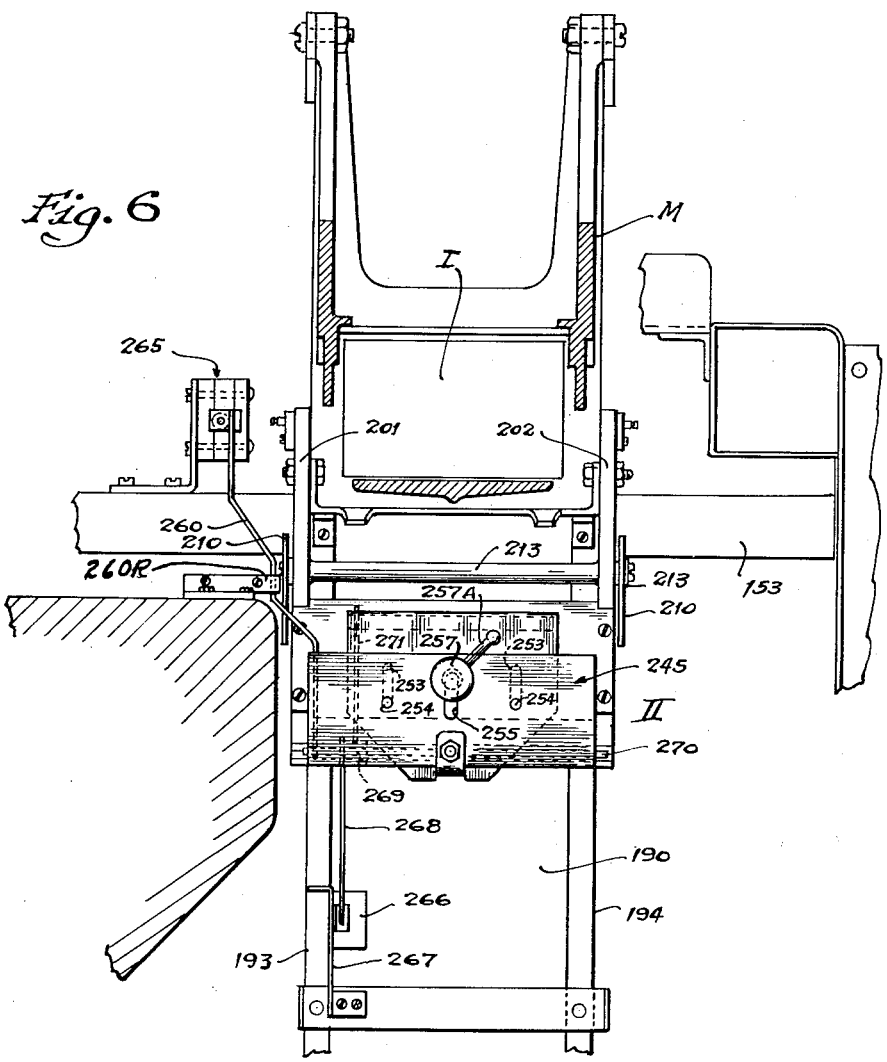
Fig. 6 is a plan view of the sensing mechanism.
Figure 6A:
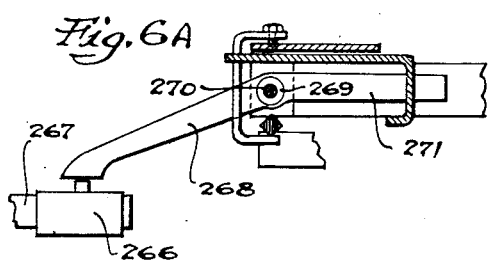
Fig. 6A is a fragmentary sectional view illustrating the total control element that is associated with the sensing means.
Figure 21:
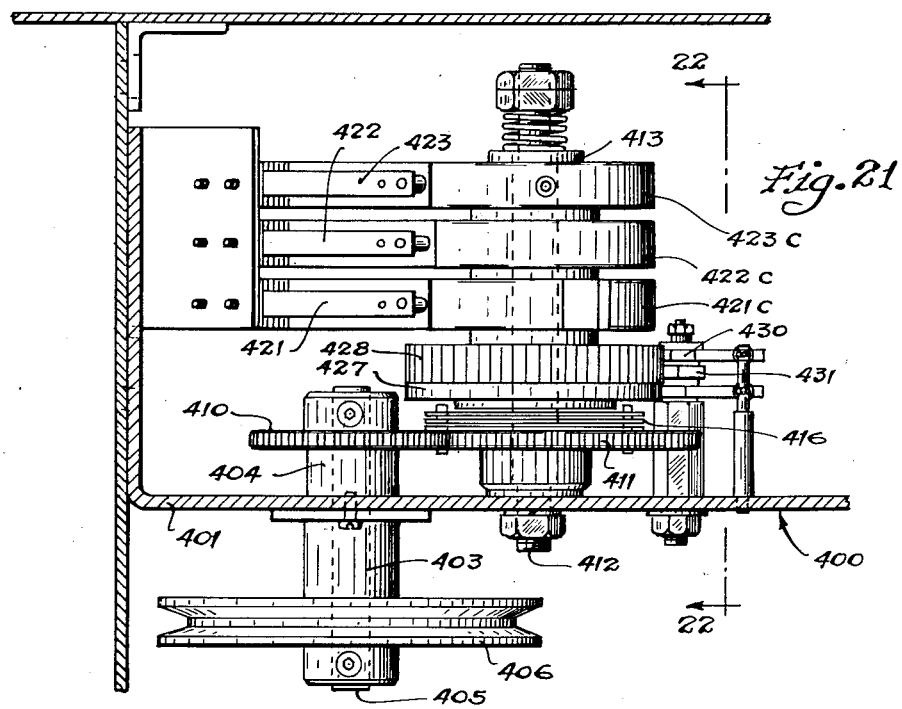
Fig. 21 is a plan view of the interval control mechanism.

The plate 248 is arranged so that it may be shifted to the left from the position shown in Fig. 11 to the position shown in Fig. 11A, thereby to expose the sensing pins 240 for removal or replacement in different positions. Thus the plate 248 has a pair of slots 253 formed therein, Fig. 6, and these slots are engaged by guide pins 254 that extend downwardly from the plate 245P. Similarly, the plate 245P has a slot 255 extending in a front to rear direction therein, and locking means are extended through the slot 255 and the plate 248 for releasably securing the plate 248 in its effective position of Fig. 11. This locking means, as herein shown, is afforded by a locking shaft 256 extended downwardly through the slot 255 and the plate 248, and this shaft 256 has a head 257 and an operating arm 257A on its upper end or above the plate 245P. Below the plate 248 a resilient locking structure 260, Figs. 7 to 10, is secured by means such as rivets or screws, and a transverse pin 256P fixed on the shaft 256 is arranged to be rotated by the shaft 256 over cam surfaces that are afforded in the structure 260. In one position the parts are securely clamped together, while in the other position of the handle 257A, the plate 248 is released for movement to its forward position of Fig. 11A.

It has been pointed out hereinbefore that the relative rocking movement of the rocker 245 on and with respect to the sensing head 200 is utilized to control the selector mechanism of the machine, and this is accomplished through the medium of a rearwardly extending transmitting arm 260, Figs. 6, 11, 12 and 19, the rear end of the arm 260 being operatively associated with a downwardly extending link 261 that is connected to the movable member of a selector switch 265. The rocker 245 is restored to its normal position when the sensing head is elevated, and this is accomplished by a resilient leaf spring abutment 260R that is disposed in the path of upward movement of the arm 260, as shown in Figs. 2, 3, 6 and 19.

The sensing head 200 also includes means operable when a tab 65 is sensed in a particular position on the printing device D by a long or special purpose sensing pin, to operate a total control switch 266 that is mounted on a bracket 267 adjacent to the left-hand side of the guide 190 and just forwardly of the sensing head 200. For this purpose a forwardly extending lever 268 is carried on the sensing head 200 so that the forward end of the lever 268 is disposed over the operating element of the switch 266. The lever 268 is carried on a sleeve 269 which is loosely mounted on a transverse pivot shaft 270 that extends between the flanges 246L and 246R adjacent the forward ends of such flanges. The sleeve 269 has an arm 271 fixed thereto, and this arm 271 extends rearwardly into a position wherein it will overlie the upper ends of long or special purpose sensing pins 240 disposed in a particular location on the sensing head 200. At this point, the flange 250 is cut away so that the arm 271 is in position for direct cooperation with the related sensing pin or pins 240. Thus, when such a particular tab 65 is sensed, the arm 271 and the lever 268 will be forced to move or rock in a counter-clockwise direction as the sensing operation proceeds, and when this occurs the end of the lever 268 will be effective to actuate the operating element of the switch 266. When such a tab is not sensed, the arm 268 may strike the operating element of the switch 266, but the lever 268 at this time may rock freely and sufficient force will not be transmitted to the switch 266 to actuate the same. Thus the switch 266 will be operated only when a tab is sensed by the pin or pins 240 that operate upon the arm 271.

In the operation of the sensing head 200 it is, of course, essential that the printing devices be accurately located at the sensing station, and means are provided for imparting such accurate location to the printing devices. Thus at station II along the printing device guideway 190, as will be evident in Figs. 3 and 4 of the drawings, a locating pawl 275 is provided, this pawl being pivoted at its rear end at 276 on the bar 194 that forms this side of the printing device guideway. The pawl 275 extends forwardly and has an inwardly projecting arm 275A that is adapted to be disposed forwardly of the forward edge of the printing device D as the printing device is moved into the sensing station. Between the arm 275A and the pivot 276, the pawl 275 has a positioning tooth 275T that is adapted to engage a notch N that is provided in the end edge of each printing device, as will be evident in Figs. 4 and 29. A pawl of this general form is illustrated in the aforesaid Hueber patent, and the cycle of operation and the functions of the pawl 275 are substantially the same, although the specific structure and operating means are different as herein shown. Thus the pawl 275 is withdrawn so that the end of the arm 275A is fully withdrawn from the printing device guideway so as to enable the printing device to be advanced out of sensing position, and after a printing device has passed the arm 275A, the pawl is allowed to move inwardly to such a position that the tooth 275T is disposed outside of the guideway while the arm 275A extends into the guideway so as to act as a preliminary stop for the next printing device as it is moved into the sensing station.

After the advancing movement has been completed, the pawl is moved further in a clockwise direction, Fig. 4, so that the tooth 275T engages the notch N and accurately locates the printing device at the sensing station. In accomplishing this operation of the pawl 275, an operating pin 277 has its reduced lower end extended through a supporting bracket 278 that extends outwardly from the lower edge of the bar 194, as will be evident in Fig. 5 of the drawings, and the reduced upper end of the pin 277 is extended through an opening in the pawl 275. The pin 277 is located adjacent to the forward end of the pawl 275, and a coil spring 279 has one end thereof connected to the pin 277 intermediate its ends. The spring 279 extends through an opening 280 in the bar 194, and the other end of the spring is engaged with an anchoring bar 281 that extends along the inner side of the bar 194. It might be pointed out that at station IIA, a similar pawl 275X is provided and a similar operating pin 277X is provided for the pawl 275X.

Thus the pawls 275 and 275X tend to assume their effective positions, and are moved outwardly at the proper times in the cycle by a cam bar 285 that is slidably mounted in a horizontal guideway formed in the outer surface of the bar 194. The cam bar 285 is maintained in this guideway by retaining bars 286. Each of the pins 277 and 277X has a cam roller 287 thereon, and cam blocks 288 are fixed on the cam bar 285 so that by rearward movement of the cam bar 285 from the position shown in Figs. 3 and 4, the pawls 275 and 275X may be moved to their released positions. The cam bar 285 is operated by a bell crank 290 which has an arm 290A with a forked upper end that engages a roller 291 on the cam bar 285. A spring 292 acts on the arm 290A to urge the bell crank 290 in a counter-clockwise direction about its pivot 293, and this serves normally to urge the cam bar 285 in a forward direction so that the pawls 275 and 275X tend to assume their operative positions in Figs. 3 and 4. The bell crank 290 is actuated in timed relation to the operation of the printing device feeding mechanism, and this is accomplished by affording a cam roller 294 on the other arm 293 of the bell crank. The roller 294 bears against a cam 295 that is included in a group of cams that are driven by the printing device feed clutch of the printing machine. It might be pointed out that this cam 295 as herein shown occupies the same position as the cam 385 that was shown in Hueber Patent No. 2,359,851 for operating the rock shaft 608 of the mechanical selector mechanism illustrated in such Hueber patent. It might be pointed out in this connection that the mechanical selector mechanism of such Hueber patent is not used in the present machine and that another selector mechanism has been afforded.

The operation of the positioning pawl 275 is so arranged that it actuates a safety switch 296 that is secured to the rail 194 just forwardly of the free end of the pawl 275. This switch includes an operating arm 297 that is pivoted at 298 to the free end of the pawl 275. The relationship between the pawl 275 and the operating arm 297 is such that when the tooth 275T sits in the notch N of a printing device, the switch 296 will be closed, but in the event that the printing device D is improperly positioned at the sensing station, the engagement of a tooth 275T with the edge of the printing device D will hold the pawl 275 in such a position that the switch 296 will be maintained in an open relationship. The switch 296 is included in a safety circuit as will hereinafter be described.

The sensing head 290 is operated in timed relationship to the printing device advancing means, and this relationship is such that the sensing head is maintained in its upper position of Fig. 3 during the first half of the machine cycle, it being during this period that the advancing movement of the printing devices takes place. Then, during the last half of the cycle, and at the time when the printing operation is being performed upon the printing device that is located at the printing station, the sensing head 290 is moved downwardly through a sensing stroke and is then allowed to return to its upper or retracted position. In accomplishing this operation of the sensing head 290, an operating link 300 is pivoted at 301 on a plate 302 that is secured to the right-hand one of the operating cams 210. A spring 303 anchored at 304 on the rail 194 extends downwardly along the link 300, and at its other end is attached to the link 300 so as to normally urge the link 300 in an upward and rearward direction, and this in turn serves to normally locate the cams 210 in their most clockwise position as shown in Fig. 3 of the drawings. The link 300 extends downwardly and forwardly and at its lower end has a fork which straddles a groove formed between a flange 305A and a cam 305, these elements being fixed on a rotatable sleeve 306. This rotatable sleeve is carried on an extension 195E of the shaft 195, which forms an element of the printing device feeding means, and the sleeve is rotatable on this extension 195E of the shaft 195. At its lower end the link 300 has a cam roller 307 that extends laterally therefrom and is arranged to engage the edge of the cam 305. This cam 305 may be termed a modived form of star cam and has six lobes 305L at equally spaced points about the edge thereof. Thus whenever the cam 305 is rotated through an indexing movement of 60°, the link 300 will be drawn downwardly by one of the lobes 305L and will then be allowed to return to its upper position, and it might be pointed out that the indexing movements of the cam 305 are terminated when the cam roller 307 engages the low space between two of the lobes 305L.

The sleeve 306 that carries the cam 305 is arranged to be actuated through such an indexing movement each time the printing device advancing means are operated, and this indexing movement takes place during the last half of the cycle of operation of such printing device advancing means. Thus, as shown in Fig. 13 of the drawings, the sleeve 306 has a toothed ratchet wheel 308 fixed thereon at a point adjacent to the rocker arm 196, and this toothed ratchet wheel has six teeth so as to correspond with the number of lobes 305F. A pawl 309 carried on a pin 310 on the rocker arm 196 extends downwardly, and the lower end thereof is arranged to ride against the rear face of the ratchet wheel 308. Thus, when the rocker arm 196 is moving in a forward direction during the first half of an operating cycle thereof, the pawl 309 rides freely over the teeth of the ratchet wheel 308. When, however, the movement of the rocker arm 196 is reversed in the last half of the machine cycle, the pawl 309 engages one of the teeth of the ratchet wheel 310 and imparts the desired indexing movement to the sleeve 306, and it might be pointed out that this indexing movement is in the direction indicated by an arrow in Fig. 14 of the drawings. In order to prevent overthrow of the sleeve 306 and the operating elements associated therewith, a conventional friction brake 312 is associated therewith, and this friction brake may be tightened by means of an adjusting screw 313 so as to insure proper actuation of the sleeve 306.

The sleeve 306 also carries a storage drum 315 that is utilized in controlling the print-skip operation of the machine in response to the sensing of the tabs 65. This storage drum is also effective to govern a signal mechanism which automatically signals the operator when certain classes or types of printing devices have been moved into printing position. Insofar as the drum 315 may be concerned, the storage mechanism is in effect duplicated for controlling the print-skip operation and for controlling the signal operation. Thus a first pair of pin supporting discs 316 and 317 are disposed relatively close to each other, and six storage pins 318 are slidably mounted in such discs 316 and 317 as will be evident in Figs. 13 and 14. The pins 318 have heads on their right-hand ends as viewed in Fig. 13, and when an actuating force is applied to such head, the pin is projected endwise to a set position wherein it extends outwardly or to the right from the disc 317. To maintain the pins in either their restored positions or their set positions, a retaining spring 320 of endless form is disposed in the space between the discs 316 and 317 so as to bear frictionally against the sides of all of the storage pins 318. This arrangement will be evident in Fig. 14 of the drawings.

As the discs 316 and 317 are rotated in the clockwise direction shown in Fig. 14, they are moved successively into a plurality of different positions at which they come to rest, and these positions are identified as stations II, II—A, III, IV and IV—T, which correspond to the different positions occupied by the printing devices D as they are moved to printing position, and after moving from station IV—T the pins are moved into station designated as station R. The station II constitutes the setting station, and means are provided that are effective upon the pin 318 that is in station II to actuate this pin from its restored position of Fig. 13 to a set position wherein such a pin projects beyond the left-hand side of the disc 317. Such setting means comprise an arm 325 pivoted on a stud 326. Below the stud 326, an operating arm 327 extends downwardly and to the left as viewed in Fig. 13, and the end of this operating arm is connected by a link 328 to the armature 329 of a solenoid 330. Thus if the solenoid 330 is energized, the setting arm 325 will rock to the left in Fig. 13 and will impart a setting movement to the pin 318 that is disposed in station II of the storage drum.

As the movement of the storage drum progresses in a clockwise direction in Fig. 14, a particular storage pin is moved from station IV to station IV—T in the same machine cycle that the related printing device D is moved into station IV—T, and it might be pointed out that this is the machine cycle that immediately precedes the cycle in which a printing operation would normally be performed on such related printing device at station V or, in other words, at the printing station. Hence, in the movement of the particular storage pin 318 from station IV to station IV—T of the storage drum, a conditioning operation is performed with respect to means that will govern the operation of the platen clutch 156 in the next machine cycle. Thus, as illustrated in Fig. 14C, the platen clutch is provided with a stop arm 156S, and this stop arm is connected by a link 333 to an arm 334 that extends forwardly from a selector control shaft 335 that is carried in a bracket 336. It might be pointed out that this selector control shaft 335 corresponds exactly with the selector control shaft 783 that is shown and described in the aforesaid Hueber Patent No. 2,359,851. This selector control shaft 335, however, is in the present instance actuated in a different way in that such actuation is attained through cooperation with the sensing pins 318 of the storage drum 315. Thus the shaft 335 has an operating arm 340 as shown in Fig. 14C, and this operating arm extends forwardly into such a position that it may be engaged by a set storage pin 318, as such pin moves from station IV to station IV—T. Hence the arm 340 normally occupies a position wherein a forward end therof is disposed just below station IV and just to the left of the disc 317, Fig. 13. Thus, if the sensing pin that is disposed in station IV has been actuated to its set position, the next indexing movement of the storage drum 315 will cause this pin to engage the arm 340 and move the same to the position shown in dotted lines in Fig. 14C. This serves, of course, to move the stop arm 332 to its ineffective position, with the result that the platen clutch 156 will be allowed to engage in the next cycle machine operation, thereby to cause a printed impression to be made from the related printing device. In the machine cycle in which such printed impression is made, the related sensing pin 318 will be moved from station IV—T to station R, and at this point the sensing pin will be in position for cooperation with the restoring arm 342. In the next machine cycle, a pin will be moved past the restoring arm 342 and the pin will be restored to the position shown in Fig. 13 prior to the return of this pin to the setting position at station II of the storage drum.

The storage drum 315 also includes a pair of plates 316B and 317B that are precisely like the plates 316 and 317, and storage pins 318B are mounted in these plates but in reversed relationship. Thus the pins 318B must be moved to the right, Fig. 13, to effect setting movement thereof, and this may be attained by a setting arm 325B that is mounted in association with the arm 325. The pins 318B are restored by a restoring arm 342B, and a solenoid 330B is similarly associated with the arm structure 325-325B so that upon operation of the solenoid 330B the storage pin 318B at station II will be moved to its set position.

The pins 318B are arranged to operate a signal such as a bell 345. This bell has a striker 346 carried on a resilient arm 347, and this resilient arm is in turn connected to an operating rocker 348. The rocker 348 is urged by a spring 349 in a clockwise direction, Fig. 14, to a position determined by a stop pin 350. The rocker 348 has an arm 348A that extends to a point disposed between the stations IV and IV—T, and a laterally projecting ear 348E on this arm is arranged to be engaged by an actuated or set pin 318B as the pin moves from station IV to station IV—T. This engagement is in the nature of a camming action and rocks the rocker 348 in a counter-clockwise direction against the force of the spring 349. Just before the pin reaches station IV—T it rides off of the edge of the ear 348E so as to release the rocker 348 for a clockwise operating movement in which the rocker strikes the stop pin 350 and the resiliency of the arm 347 allows the striker 346 to engage the bell 345. This signals the operator, who may then give attention to the machine.

The sensing pins 240 that are used for sensing the tabs 65 may be in one of three different lengths in accordance with known practice. Thus, as disclosed in the aforesaid Hueber Patent No. 2,359,851, a sensing pin of regular length is identified as No. 525A—1, a sensing pin of intermediate length is identified as No. 525A—2, and a long sensing pin, commonly termed a bell pin, is identified as No. 525A—3. It will be evident that when a tab 65 is not sensed by a pin of any one of the aforesaid kinds, the rear end of the arm 260, at the end of the downward sensing stroke of the sensing head 200, will be disposed in a position which may be termed the normal or lower position thereof. Under the same circumstances, however, if a tab 65 has been sensed by a regular sensing pin, the rear end of the arm 260 will be disposed at a somewhat higher or second level. Similarly, the sensing of a tab by an intermediate length pin will dispose the rear end of the arm 260 at a third and somewhat higher level, while the sensing of the tab 65 by a long or bell pin will dispose the rear end of the arm 260 at its highest or fourth level. This elective location of the rear end of the arm 260 is utilized to set the selector switch 265 selectively in any one of four different positions in accordance with the sensing operation of the sensing head 200.

Thus, referring particularly to Figs. 15 to 19, it will be observed that the selector switch 265 is supported by a bracket 360 from the frame bar 153. The selector switch 265 is made up of two sections 361 and 362 of insulating material that are clamped by bolts 363 on opposite sides of two bars 364, and these bars 364 are spaced apart so as to afford a central passage defined by the plates 361 and 362 and the two bars 364, and within this passage a movable switch element 365 is arranged for vertical movement by link 261 to which the movable switch 365 is connected. The movable switch member 265 has a U-shaped contact member 366 fixed thereto, and this U-shaped member has an upper horizontal arm 366U and a lower horizontal arm 366L extended therefrom so as to wipe along the inner surface of the bar 364. The movable switch member 365 also has a ratchet member 367 fixed thereon, and this ratchet member has four vertically spaced notches formed therein which, by cooperation with a resilient metal pawl 368, serve to determine four different vertical positions of the movable switch member 365. The spring pawl is connected to a terminal 369 and serves as a conductive path to the ratchet bar 367 so that one side of a circuit may be extended from the terminal 369 through the ratchet bar 367 and to the contact member 366.

In the different vertical positions of the movable switch member 365, as determined by the teeth of the ratchet bar 367, the arms of the switch contact 366 engage a plurality of contacts 371, 372, 373 and 374 in different relationships. It might be noted that the contacts 371 and 372 are connected by wire 375, while the contacts 373 and 374 are independent of each other and are independent with respect to the contacts 371 and 372. When the movable contact 365 is in the lower position of Fig. 18A, which position is assumed when no tab is sensed, the upper arm 366U of the movable contact engages the stationary contact 372. When the movable contact 265, in response to the sensing of a tab 65 by a regular sensing pin, is located in its second position, the contact arm 366L engages the contact 374 and the upper arm 366U is out of engagement with all of the other contacts. When a tab 65 is sensed by an intermediate length pin, the switch contact 366 is disposed in the position shown in Fig. 18C, wherein it will be evident that the switch arm 366L is in engagement with the stationary contacts 373 and 374. Finally, the sensing of the tab 65 by a long or bell pin serves to move the switch contact 365 to its upper or fourth position in which the contact arm 366U engages the contact 371 and the contact arm 366L engages the contact 373.

The circuits that are completed in each of the four different positions of the movable contact 365 will be described hereinafter, but as a preliminary it might be stated that the machine is arranged so that it may be set for either skip-tab or print-tab operation so that certain of the stationary contacts of the selector switch are rendered ineffective in accordance with the print-tab or skip-tab setting of the mechanism, as will hereinafter be described.

In the use of the present machine, it is usually desirable to cause a total to be taken and printed on the proof sheet PS each time a selected number of business instruments have been produced, and the number of business instruments to be included in each total may differ in accordance with the character of the business instruments that are being produced. Under the present invention, an automatic total control mechanism is incorporated in the machine, and this mechanism is arranged so that it may be set to produce totals for item groups of different sizes. Thus, the mechanism as herein disclosed, is arranged so that it may be set for groups of three different sizes. The interval counting mechanism that is thus afforded is disclosed in detail in Figs. 20 to 27C of the drawings, and it is mounted within the frame 42 of the machine adjacent to and somewhat below the pulley 148. This unit is identified in Fig. 20 by the reference character 400, and it embodies a supporting frame 401 that is connected by screws 402 to the side wall of the frame 42 of the printing machine. The frame 401 is in the form of a plate having a pair of bearings 403 and 404 secured on opposite sides thereof. Within the bearings 403 and 404 a stub shaft 405 is mounted and a pulley 406 mounted on the shaft 405 is constantly driven by a belt 407 that extends from a pulley 408 that is connected to a concentric with the pulley 148. Thus the shaft 405 is constantly driven during operation of the printing machine, and a gear 410 fixed on the other end of the shaft 405 adjacent to the bearing 404 is meshed with a gear 411 that is mounted on a shaft 412 for free rotation thereon. The shaft 412 also supports a sleeve 413 which is urged by means of a coil spring 414 and a nut 415 so as to engage a frictional drive 416 that is afforded on the gear 411. The gear 411 is constantly driven in a counter-clockwise direction as indicated by the arrow in Fig. 24, and the sleeve 413 thus tends to be driven by the frictional drive 416 in this same direction.

Figure 24:
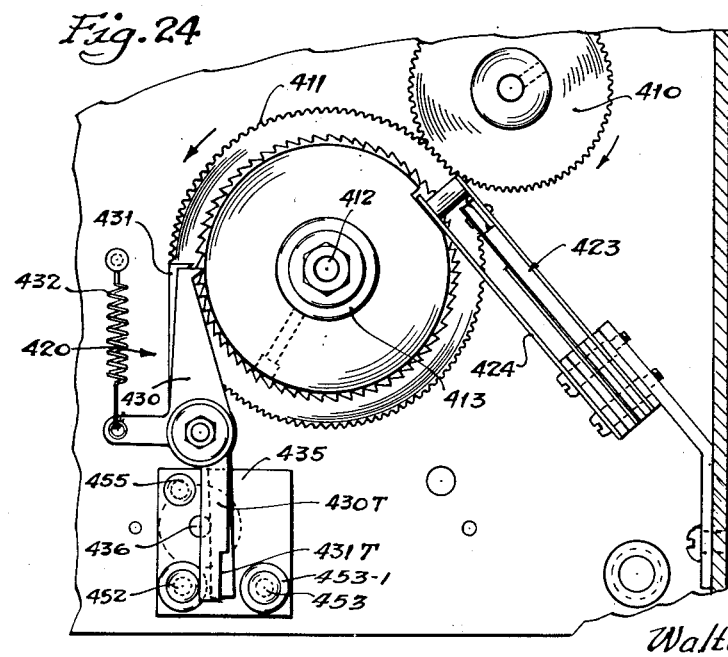
Fig. 24 is a view showing the control pawl mechanism.
Figure 26A:
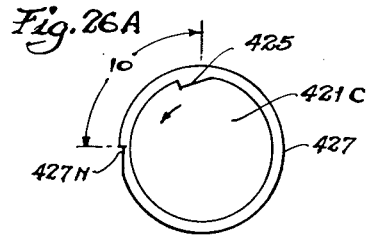
Figs. 26A, 26B and 26C are views illustrating the form and relationship of the several cams to the escapement mechanism of the interval control means.
Figure 26B:
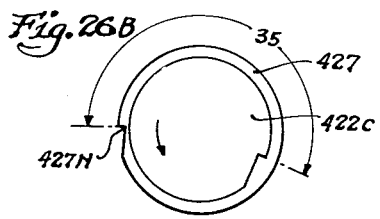
Figure 26C:
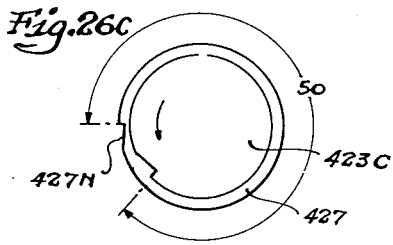
Figure 25:
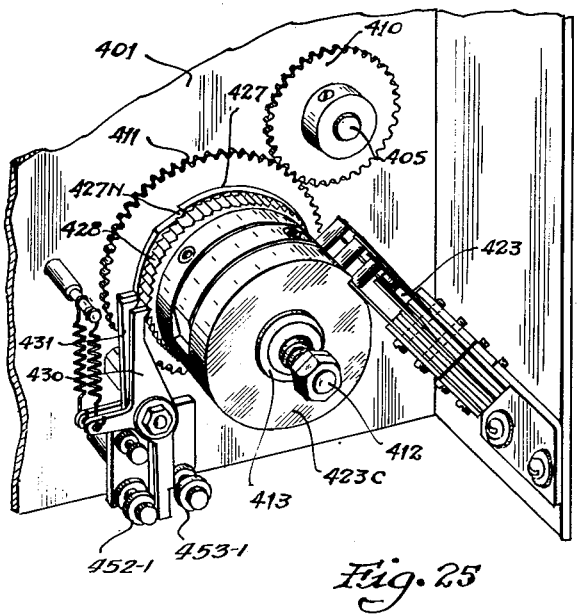
Fig. 25 is a perspective view showing the control pawl mechanism and its relationship to the cams.

The constantly applied driving force that is thus applied to the sleeve 413 is controlled by the escapement mechanism 420, and the relationship is such that the sleeve 413 may be allowed to advance through a small increment for each operation of the printing machine, or through what may be termed a resetting movement when a new counting cycle is to be initiated. This control of the sleeve 413 is utilized to govern the closure of a plurality of switches 421, 422 and 423. Thus, as shown in Fig. 24 with respect to the switch 423, it will be observed that the switch tends to normally assume a closed position, but a follower arm 424 is provided which may be flexed to the right in Fig. 24 so as to open the switch 423. Similar follower arms 424 are provided with respect to each of the switches 421—2—3, and these arms are arranged to bear respectively again cams 421C, 422C and 423C that are fixed on the sleeve 413. The arrangement is such that when the follower arm engages the outer dwell surface of its cam, the related switch is held open, but when the related cam has advanced a predetermined number of angular spaces, a recess 425 in the cam moves into alignment with the follower arm 424 so as to allow the related switch to assume its closed position as shown in Fig. 24. The number of intervals through which any one of the cams must move before such switch closure is accomplished is determined by the angular position of the particular cam with relation to a notch 427N in a main control disc 427 that is also fixed on the sleeve 413, as will hereinafter be described.

The interval through which the sleeve 413 is advanced for each operation of the printing machine is determined by the escapement mechanism 420 which cooperates with a ratchet wheel 428 that is also fixed on the sleeve 413 adjacent to the disc 427. The ratchet mechanism 420 comprises a main pawl 430 and a secondary or half-tooth pawl 431, and a spring 432 acting on the arm 430 tends normally to engage the pawl 430 with the teeth of the ratchet wheel 428. The pawls 430 and 431 have downwardly extending tail portions 430T and 431T as will be evident in Fig. 24, and the operation of the pawls 430 and 431 is accomplished by a rocking plate 435 that has means thereon for engaging and controlling the position of the tail portions 430 and 431T. The rocking plate 435 is mounted on a stub shaft 436 that extends through the frame plate 401, and means are afforded on the opposite side of the frame plate 401 for operating and controlling the rocking movements of the rocking plate 435. This rocking plate not only controls the operation of the escapement pawls 430 and 431, but also serves to control what may be termed a reset pawl 440 that is mounted on the same axis as the escapement pawls 430 and 431 for cooperation with the notch 427N of the reset disc 427. The reset pawl 440 has a tail portion 440T that extends downwardly generally parallel to the tails of the other pawls, and the pawl 440 is arranged to be urged by a spring 432 toward engagement with the edge of the reset disc 427, thereby to enable this pawl 440 to engage the reset notch 427N that is formed in the periphery of the disc 427.

Figure 27A:
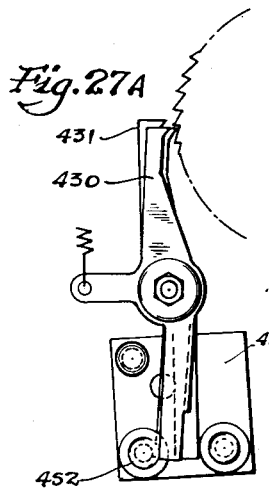
Figs. 27A, 27B and 27C are views illustrating the operation of the escapement mechanism.
Figure 27B:
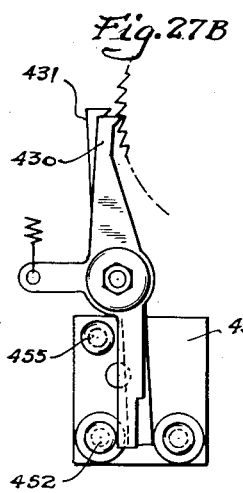

The rocking plate 435 normally occupies the position shown in Figs. 24 and 27B of the drawings, and it is urged to this position by a spring 442 acting on an arm 443 that is adjustably fixed to the shaft 436 on the side of the plate opposite to the location of the rocking plate 435. Normally, this position is determined by engagement of the upper end of the lever arm 443 with a stop shoulder 444 formed on a stop lever 445. It might be pointed out that when a resetting operation is to take place, the stop lever 445 which is pivoted at 446 is withdrawn in an upward direction by a solenoid 447, thereby to release the stop shoulder 444 and allow pivotal movement of the arm 443 to the right in Fig. 20 until the upper end of this arm engages a stop shoulder 444R. This causes the rocking plate 435 to rock in a counter-clockwise direction from the position of Fig. 27B to the position shown in Fig. 27A, and as will hereinafter be pointed out, this releases the escapement pawls 430 and 431 so as to allow the friction drive 416 to drive the sleeve 413 in an advancing direction until the notch 437N on the reset disc 427 engages the reset control pawl 440.

When the stop arm 445 is in its normal position of Fig. 20, the arm 443 may be withdrawn or actuated to the left, Fig. 20, by a solenoid 450, and this moves the upper end of the arm 443 away from the shoulder 444, and during such movement the stop arm 445 is maintained in the desired relation by engagement of a surface 445S thereof with the upper end of the arm 443. Such actuation of the arm 443 rocks the rocking plate 435 in a clockwise direction from the normal position of Fig. 27B to the position of Fig. 27C, and this acts, as will hereinafter be described in detail, to release the pawl 430 and allow the pawl 431 to move into cooperative engagement with the teeth of the ratchet wheel 428. This allows the sleeve 413 to advance through what may be termed a half-tooth space, and when the solenoid 450 is deenergized, the pawl 430 is allowed to return to its normal position of Fig. 27B, while the pawl 431 is withdrawn so that the sleeve 413 completes its advancing movement through the balance of the tooth spaces.

Figure 22:
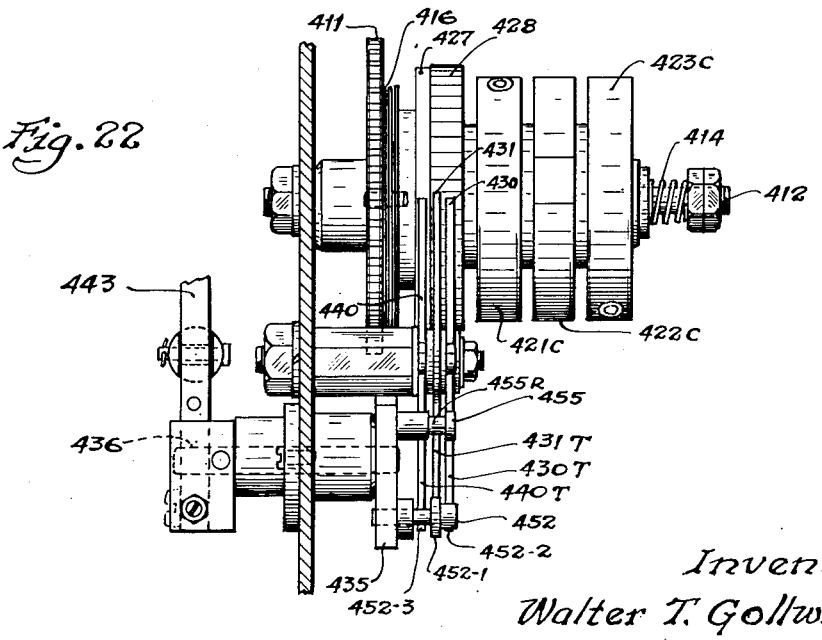
Fig. 22 is a sectional view taken along the line 22—22 of Fig. 21.
Figure 23:
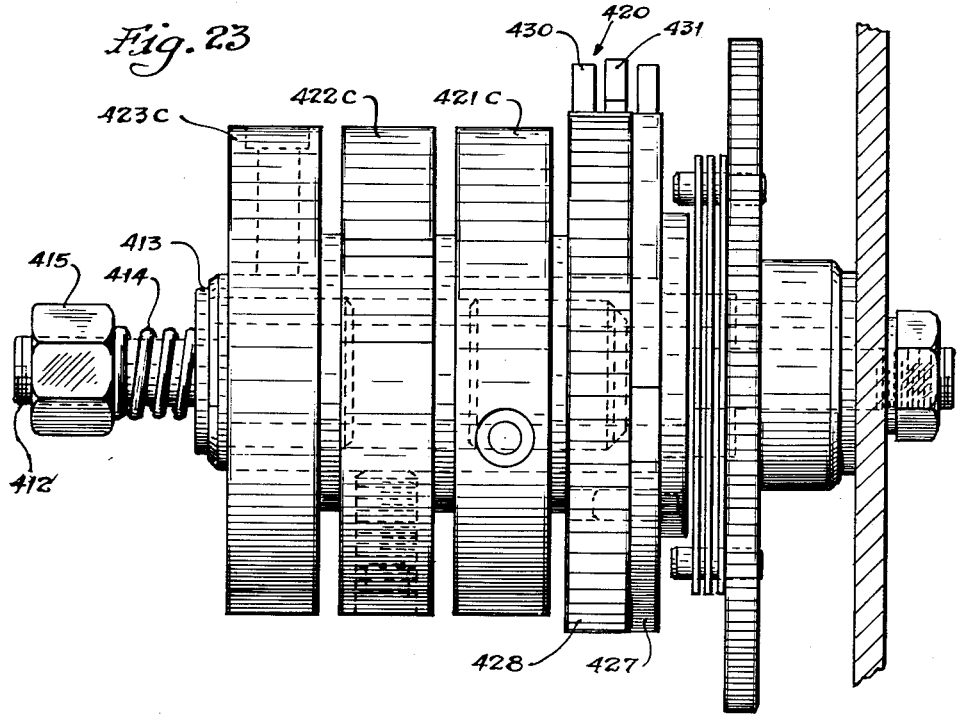
Fig. 23 is a detail view showing the control cams of the interval control mechanism.

In attaining such operation of the escapement pawls, it should be observed that near the lower left-hand corner of the rocking plate 435, a stud 452 is provided that extends along the left-hand edge surfaces of the tails of the several pawls, and this stud 452 has portions of different diameters for engagement with the respective pawls. Thus, a relatively large size disc portion 452—1, Fig. 22, is arranged in alignment with the tooth 431T and the relation is such that when the rocking plate 435 is in the position of Fig. 27B, this disc portion 452—1 will be in engagement with the tail 431T so as to hold the pawl 431 in its disengaged relationship of Fig. 27B. The stud 452 also has a somewhat smaller disc portion 452—2 that is disposed as shown in Fig. 22 in alignment with the tail 430T. The relationship is such that when the rocking plate 435 is in the position shown in Fig. 27B, the main pawl 430 will be engaged with a tooth of the ratchet wheel 428. The stud 452 also has a relatively small portion 452—3 in alignment with a tooth 440—T of the reset pawl, and the relationship is such that when the rocking plate 435 is in the normal position of Fig. 27B, the reset pawl 440 is allowed to bear against the edge of the reset disc 427.

Figure 27C:
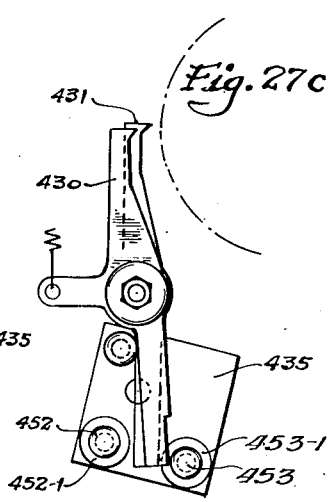

When the rocking plate 435 is actuated from the position shown in Fig. 27B, to the position shown in Fig. 27C, the disc portion 452—1 moves to the left away from the tooth 431—T, and a wide disc portion 453—1 on another stud 453 on the plate 435 engages the other or right edge of the tail 431T, thereby to positively move the pawl 431 to its effective position as shown in Fig. 27C. At about this same time, means carried on the rocking plate are effective to disengage the pawl 430. Such means are afforded by a stud 455 mounted on the rocking plate near the upper left-hand corner as viewed in Fig. 27B. The stud 455 has a reduced portion 455R, as shown in Fig. 22, that is disposed opposite the tail 431T so that in the rocking movement of the rocking plate 435 from the position shown in Fig. 27B to the position shown in Fig. 27C, the tooth 431T is not engaged by this portion 455R of the stud 455. The portions of the stud 455 that are disposed in alignment with the tails 430T and 440T are, however, of such a size that in the aforesaid rocking movement of the plate 435, the tails 430T and 440T are engaged and the escapement pawl 430 and the reset pawl 440 are disengaged. Thus in a rocking movement from the position shown in Fig. 27B to the position shown in Fig. 27C, the sleeve 413 will be allowed to advance even though the reset pawl 440 may have been engaged with the notch 427N, and the advancing movement is completed when the rocking plate 435 returns to the position shown in Fig. 27B. Thus the sleeve 413 will be advanced through one tooth space each time the solenoid 450 is energized. Hence, when the sleeve 413 has been advanced through a sufficient number of tooth spaces, the notch 425 of one of the cams will be moved into alignment with the follower 424 of the related switch, thereby to allow such switch to close, and continued indexing movement will cause the several switches to close at different times in accordance with the setting of their cams in a rotation sense with respect to the location of the reset notch 427N. It will be understood that but one of the switches will be in an effective circuit at any one time.

When the switch that is in an effective circuit is thus closed, it is necessary that the mechanism be reset to the zero position determined by the notch 427N, and when this is to be accomplished, the solenoid 447 is energized so as to raise the stop lever 445. This allows the rocking plate 435 to move to the position shown in Fig. 27A, thus to release both of the escapment pawls 430 and 431 while allowing the reset pawl 440 to remain in its engaged relationship with respect to the edge of the reset disc 427. Hence the friction drive 416 will act to advance the control sleeve 413 to the zero position determined by the pawl 440 and the notch 427N. The parts remain in this relationship until the next actuation of the solenoid 450, and when this occurs, the lever 443, Fig. 20, is moved from engagement with the shoulder 444R and through its normal stroke past the shoulder 444. The stop lever 445 then returns to its normal position of Fig. 20, and in the stroke of the lever 443 beyond or to the left of the shoulder 444, the rocking plate 435 is operated through its normal stroke in which the pawl 431 is first rendered effective and the pawls 430 and 440 are rendered ineffective. In the return movement of the rocking plate 435 to the position shown in Fig. 27B, the first indexing movement of the control sleeve 413 is completed and the pawls 430 and 440 return to their normal positions.

The interval counting unit 400 also includes a normally closed switch 460, Fig. 20, that is included in the control circuit governed by the unit 400, as will hereinafter be described, and which is arranged to be opened whenever the unit 400 is operated through its reset cycle. Thus a laterally projecting pin 461 on the arm 443 is arranged to open the switch 460 when the arm 443 is rocked into engagement with the shoulder 444R in the course of a reset operation.

*The operative connection of the units*

Figure 36:
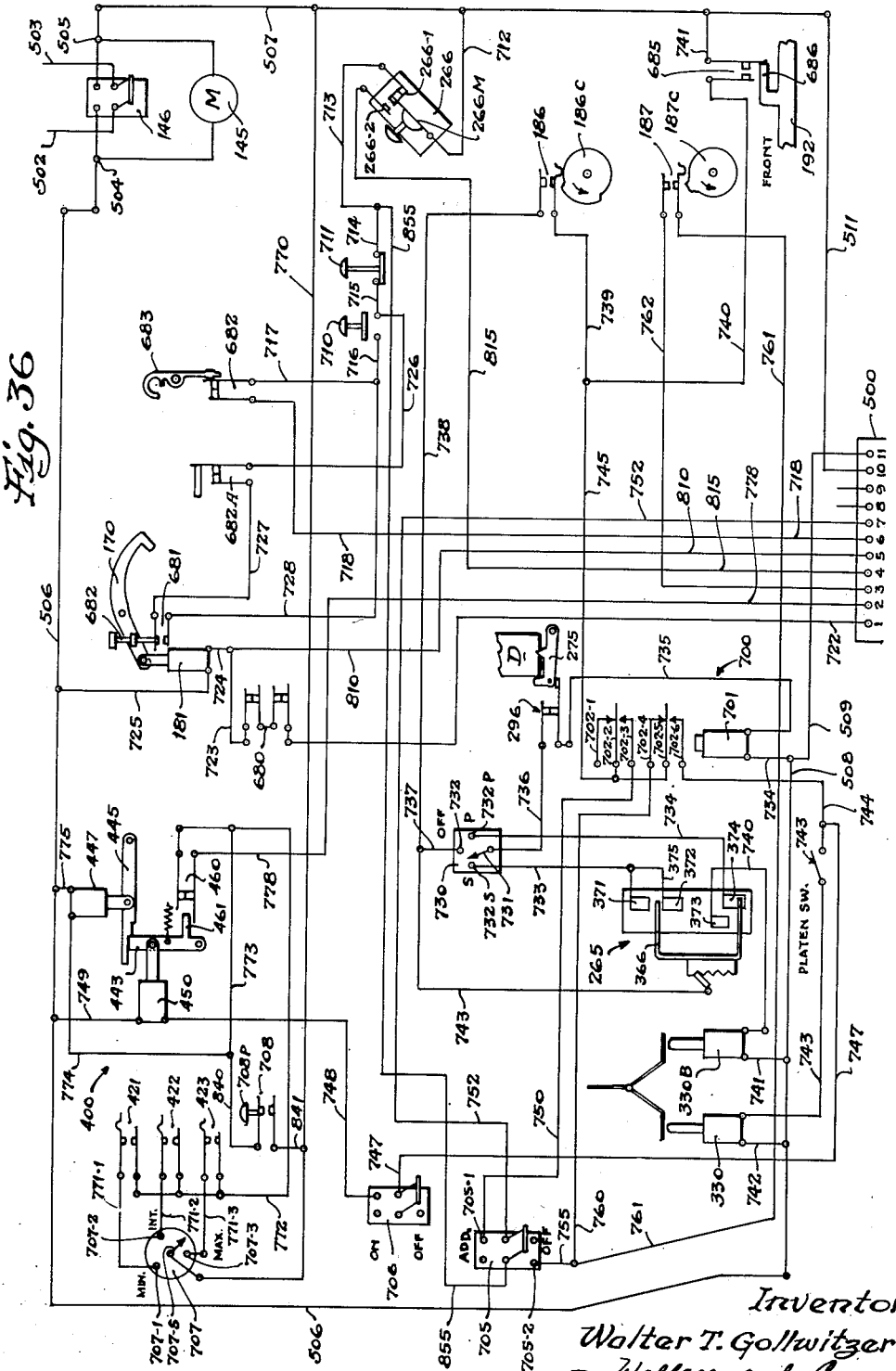
Figs. 36 and 36A, when taken together, constitute a schematic wiring diagram for the machine.
Figure 36A:
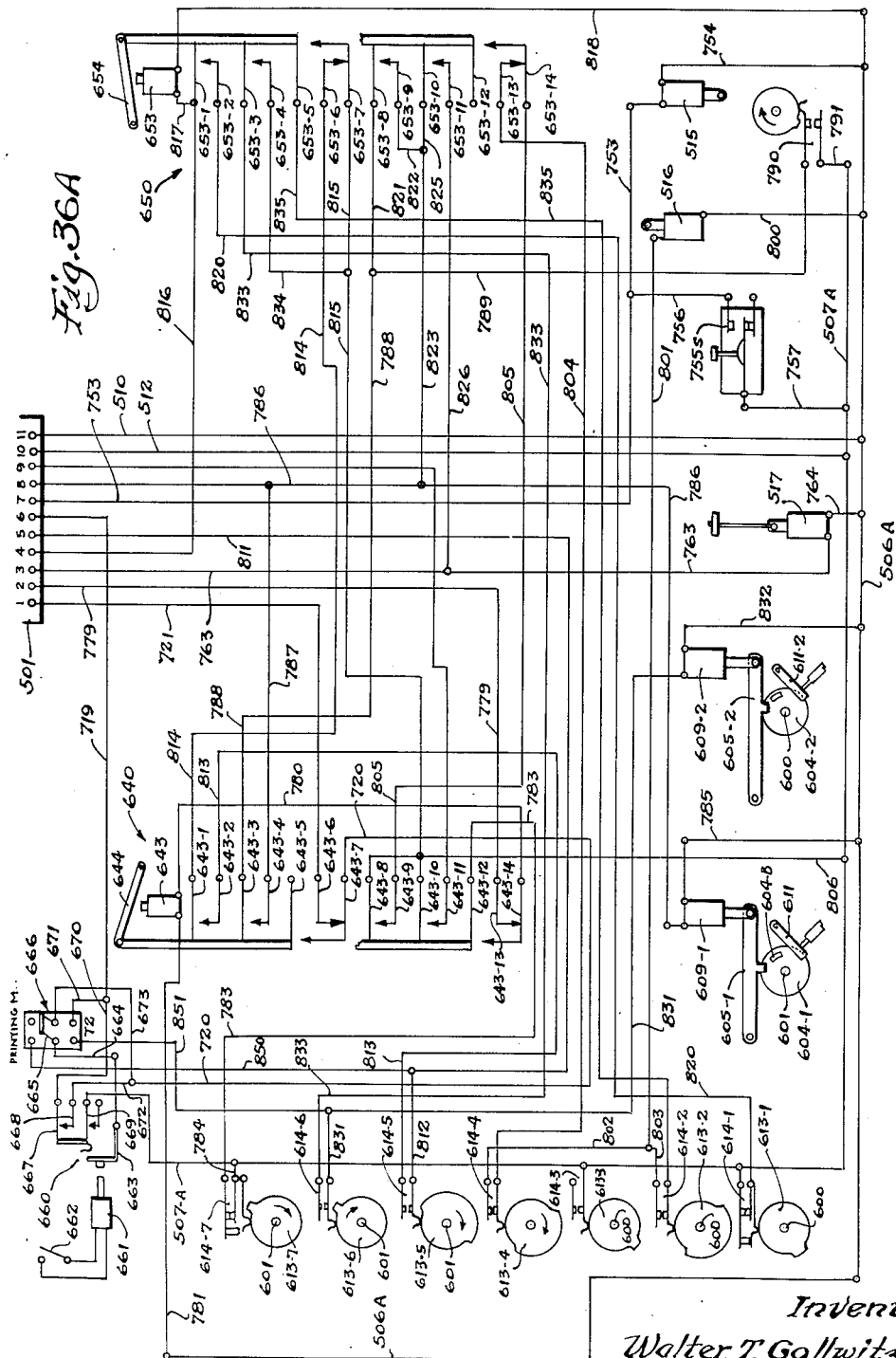

The main motor switch 146 on the front panel of the printing unit 40 is arranged not only to start the motor 145 but also to connect the power source to the various electrically operable units in the printing machine, and the power and control circuits between the printing unit 40 and the adding and listing unit 41 are extended through a plug 500 and a socket 501 as shown in Figs. 36 and 36A. The power lines 502 and 503 are connected to input terminals of the switch 146 and when the switch is closed, the power is extended to terminals 504 and 505 to which opposite terminals of the motor 145 are connected. The terminals 504 and 505 are connected respectively to power leads 506 and 507 that in Fig. 36 extend along the left and right-hand ends of the sheet and constitute the opposite sides of the various control circuits.

The plug 500 and the socket 501 are provided with eleven mating contacts, and these contacts have been numbered from 1 to 11 in Figs. 36 and 36A. The wire 506 has a pair of wires 508 and 509 in series extended therefrom to the number 11 contact of the socket 501 to a wire 506A in the adding and listing unit 41 so that the wire 506A constitutes one side of the various operating and control circuits within the adding machine. Similarly, a wire 511 is extended from the wire 507 to the number 10 contact of the plug 500, and a wire 512 extends from the number 10 contact of the socket 501 to a wire 507A in the adding and listing unit 41 so that the wire 507A may constitute the other side of the various actuating and control circuits within the adding and listing unit.

The various control mechanisms within the adding and listing unit 41 are in all major respects similar to the control elements described in my aforesaid copending application, and certain of these elements are illustrated in a diagrammatic way in Fig. 36A of the drawings. Thus the main clutch of the adding and listing unit is governed by a solenoid 515 which corresponds to the clutch solenoid 343 in my aforesaid copending application, while the long paper feed that is attained in the adding and listing unit when a total is printed is governed by a paper feed solenoid 516 that corresponds with the paper feed solenoid 630 in my aforesaid copending application. Similarly, a solenoid 517 is included in the adding and listing unit 41 for governing the restoring operation of the set-up pins and the associated Bowden cables in those cycles where the adding and listing unit 41 is not operated through a cycle, and the solenoid 517 corresponds with the cable restoring solenoid 224 of my aforesaid copending application.

The adding and listing unit 41 also includes control means for operating the adding and listing unit through total taking cycles that have been identified in my aforesaid copending application as T—1, T—2 and T—3 total taking cycles. Such means are, of course, included in the adding and listing unit 41 of the present apparatus and the manual means for accomplishing this is shown in Fig. 1 as comprising a total control handle 520 that corresponds with the handle 495 of my aforesaid application, while the automatic control elements are diagrammatically illustrated in Fig. 36A of the drawings. Thus a T—1 total control unit is provided which includes a shaft 601 adapted to be driven through a single revolution under control of a clutch control solenoid 609—1. This solenoid serves to release a stop lever 605—1 which engages a notch in a control disc 604—1 that is fixed on the shaft 601. When a T—1 total is to be taken, the solenoid 609—1 is energized to thereby release the pawl or stop lever 605—1, and in the course of rotation of the disc 604—1, a block 604B on the disc engages on arm 611 to actuate a Bowden cable that operates as described in my aforesaid copending application to set the total control shaft of the adding and listing unit for a T—1 total operation of the machine while at the same time initiating such cycle.

The shaft 601 in its single cycle of rotation is arranged to drive five cams 613—7 to 613—3, and these cams serve to operate control switches 614—7 to 614—3, respectively, these switches being included in control circuits as will hereinafter be described.

The operation of the adding and listing unit 41 through a cycle in which a T—2 total is taken is controlled by means including a generally similar total control mechanism that has a control solenoid 609—2 operating to release a stop lever 605—2 and to thereby free a disc 604—2 for rotation in which an associated lever 611—2 is operated so as to actuate a Bowden cable and set the total control shaft of the adding and listing unit for a T—2 total operation. The disc 604—2 is fixed on a shaft 600 which has two cams 613—2 and 613—1 fixed thereon, and these cams are arranged respectively to actuate switches 614—2 and 614—1 as will hereinafter be described.

The adding and listing unit includes a T—1 total control relay 640 having an operating winding 643 and a plurality of contacts 643—1 to 643—14, and an armature 644 is arranged to operate the various contacts as will hereinafter be described. The adding and listing unit also includes a T—2 control relay 650 having an actuating coil 653 and contacts 653—1 to 653—14, and here again, an armature 654 is arranged to operate these contacts as will be described in detail hereinafter.

In many instances it is desirable to have a control switch located adjacent to the adding unit, and in Fig. 36A a plug-socket 660 is illustrated that is adapted to receive a plug 661 to which a normally open foot switch 662 is connected. The plug-socket 660 has one contact 663 connected by a wire 664 to one central contact 665 of a double-throw switch 666 whereby the governing action attained by the foot switch 662 may be changed. The plug-socket 660 also has a pair of normally engaged contacts 667 and 668, and it also has a contact 669 that is engaged by the other lead from the foot switch 662 when the plug 661 is put in place. Such insertion of the plug 661 serves to open the contacts 667—668. The contact 667 is connected by wires 670 and 671 to one of the lower contacts of the switch 666, while the contact 668 is connected by wires 672 and 673 to the other central contact of the switch 666, and as will hereinafter be described in detail, the setting of the central contact 665 in its lower position renders the switch 666 effective to initiate a T—2 total operation of the adding and listing unit, while placing the central contact 665 in its upper position places the switch 666 in control of the printing machine for starting operation thereof.

In the printing machine, the paper safety means of the sheet feeding mechanism of the aforesaid Morse patent is associated with the control circuits and is disclosed in Fig. 36 as a pair of switches 680 which are in series and are normally closed when the proper sheet feeding relationship is present. The printing machine also includes a switch 681 that is operated by a screw 682 carried on the pawl 170 of the main clutch of the printing machine. The arrangement is such that the switch 681 is closed when the solenoid 181 is energized, and this switch is included in a holding circuit that maintains the printing machine in operation. This holding circuit also includes a safety switch 682A that is normally closed. Another switch 682 of the normally open type is also provided and is shown in Figs. 19 and 36 of the drawings, and this switch is arranged to be closed by a lever 683. This lever 683 has its upper end disposed in the bottom of the magazine of the printing machine, and when a supply of printing plates is located in the magazine M, the switch 682 is closed.

Another switch 685 of the normally closed type is illustrated in Fig. 36, and this switch is arranged to be engaged by an arm 686 carried on one of the carrier bars 192. The arrangement is such that the switch 685 is opened whenever the carrier bars 192 reach their rear or rest positions. This switch 685 is utilized to prevent operation of certain control mechanisms in the machine during duplicate or other multiple operations of the printing machine where such control operations are to be performed only in respect to the feeding cycles in which printing devices are advanced in the printing machine.

The printing machine includes a timing relay 700 having an operating coil 701 and six contacts 702—1, 702—2, 702—3, 702—4, 702—5 and 702—6. The contact 702—2 is normally engaged with the contact 702—1 while the contact 702—5 is normally engaged with the contact 702—4. When the timing relay 700 is operated, the contacts 702—2 and 702—5 are moved out of engagement with the respective contacts 702—1 and 702—4, and are moved into engagement with the respective contacts 702—3 and 702—6. The connections for these various contacts will be described in detail hereinafter.

The front panel board of the printing machine also includes a switch 705 for turning the adding machine on or off, and this switch is illustrated in Figs. 1 and 36 of the drawings. A switch 706, Figs. 1 and 36, is also mounted on the front panel of the printing machine, and this switch is utilized for rendering the interval control unit 400 effective or ineffective. A settable switch 707 is also mounted on the front panel board whereby the controlling action of the interval counter 400 may be set for different intervals. Thus the switch 707 has a contact 707—1 for the minimum interval, a contact 707—2 for the interval of intermediate length, and a contact 707—3 for the maximum interval length, and these contacts may be selectively engaged by a shiftable contact 707—S. As an alternate means for attaining a reset operation of the interval counter, still another switch 708 is provided, this switch being normally open and being adapted to be closed by a push button 708P to attain a reset operation, as will hereinafter be described.

*The starting and running circuits*

When the operation of the printing machine is to be started, this may be accomplished by depressing a start switch button 710 that is located on the front panel of the printing machine and the effect attained by this depression of the start button 710 is to energize the control solenoid 181 of the main clutch of the adding machine. The circuit that attains such energization of the solenoid 181 includes a number of switches such as the stop switch 711 that is normally closed. Also, the switch 266 is included in this circuit, it being noted that this switch 266 has a movable contact 266M and two stationary contacts 266—1 and 266—2. The contact 266M is connected by wire 712 to the line wire 507 and the contact 266M is normally engaged with the contact 266—1. In affording the starting circuit, a wire 713 and a wire 714 in series extend from the contact 266—1 to one contact of the stop switch 711, and a wire 715 connects the other terminal of the stop switch 711 to one terminal of the start switch 710. Wires 716 and 717 extend from the other terminal of the start switch to one contact of the last-plate safety switch 682, and a wire 718 extends from the other contact of this switch to the number 6 contact of the plug 500. A wire 719 extends from the number 6 contact of the socket 501 to the juncture of the wires 670 and 671, thereby to be connected to the normally closed switch contact 667. Circuit is thus extended to the wire 672, and a wire 720 extends from the wire 672 to the contact 643—7 of the T—1 relay 640. The contact 643—7 is a movable contact and is normally engaged with the contact 643—6, and from this last contact, a wire 721 extends to the number 1 contact of the socket 501. A wire 722 extends from the number 1 contact of the plug 500 to one terminal of the sheet safety switches 680, and wires 723 and 724 extend in series from the other contact of the safety switches 680 to one terminal of the clutch control relay 181, a wire 725 extending from the other terminal of this relay to the line wire 506. Thus an initial energizing circuit is afforded for the clutch control solenoid 181 so that this circuit may be energized by depression of the start switch 710.

When the solenoid 181 is thus energized, the switch 681 is closed so as to thereby afford a holding circuit for the solenoid 181 in shunt around the starting switch 710. This holding circuit is afforded by extending a wire 726 from the wire 715 to one terminal of the auto-stop switch 682, a wire 727 being extended from the other terminal of this switch to one contact of the switch 681. A wire 728 extends from the other contact of the switch 681 to the wire 717, so that a shunt circuit is thereby afforded around the start switch 710. This affords a holding circuit that may be broken in several different ways. Thus the holding circuit may be broken so as to stop the machine merely by depressing stop switch 711. Similarly, this holding circuit may be broken by operation of the total control switch 266 so as to separate the contact 266M from the contact 266—1, by the auto-stop mechanism, which includes the switch 682, by the last-plate safety switch 682, by the sheet safety switches 680, or by operation of the T—1 relay 640 which would, of course, serve to separate the contact 643—7 from the contact 643—6.

*The timing and selector circuits*

The timing relay 700 is normally under control of the selector switch 265, and the association of the timing relay 700 with the selector switch 265 is adapted to be changed by a selector control switch 730. This switch has a movable contact 731, a stationary contact 732 which constitutes the "off" position, and contacts 732S and 732P that constitute respectively the skip-tab and print-tab positions for the switch 730. The contact 732S is connected by a wire 733 to the wire 375, thereby to be connected to the contacts 371 and 372 of the selector switch 265. The stationary contact 732P is connected by wire 734 to the contact 374 of the selector switch.

The operating coil 701 of the timing relay 700 has one terminal connected by a wire 734 to the wire 508, thereby to establish a connection with the line wire 506. The other terminal of the timing relay 700 is connected by a wire 735 to one contact of the safety switch 296 that is disposed at sensing station, and a wire 736 extends from the other contact of this switch to the movable contact 731 of the selector setting switch 730.

When the contact 731 is in the "off" position, that is, in engagement with the contact 732, circuit is extended by a wire 737 and a wire 738 in series from the contact 732 to one contact of the timing switch 186. Wires 739 and 740 in series extend from the other contact of the switch 186 to one contact of the switch 685, and a wire 741 connects the other contact of this switch to the other line wire 507. Thus in those cycles of the machine operation when the carrier bars 192 are operated so as to allow the switch 685 to close, the operation of the timing switch 186 will, in the last half of the machine cycle, close circuit to the timing relay 700, and hence this timing relay 700 may accomplish its several functions as will be hereinafter described even though the selector mechanism is set in its "off" position.

The wire 738 has an extension 743 that is connected to the movable contact 366 of the selector switch 265, and hence when the movable contact 731 is set in engagement with either of the other two stationary contacts 732S or 732P, the controlling circuit to the timing relay may be completed in accordance with the sensing operation of the sensing head 200 and the related setting of the selector switch 265. It might be pointed out that when the movable contact 366 of the selector switch 265 engages the contact 374, the bell-control solenoid 330B will be energized directly through a circuit that includes a wire 740 extended from the contact 373 to one terminal of the solenoid 330B, the other terminal being connected by a wire 741 to the wire 508.

When the timing relay 701 is energized, the shifting of the contacts thereof is arranged to close the circuit to the solenoid 330 of the storage mechanism, to the solenoid 450 of the interval counting mechanism and to the clutch solenoid 515 of the adding and listing unit, it being noted that manually operable cutout switches are included in certain of these circuits so that the operation of the machine may be modified under some circumstances. Thus, with respect to the solenoid 330, it will be noted that a wire 742 connects one terminal of this solenoid to the wire 508, and a wire 743 is extended from the other terminal of this solenoid to one contact of an "off-on" switch 743. A wire 744 extends from the other terminal or contact of the switch 743 to the contact 702—6 of the timing relay. When the timing relay 700 is operated, the contact 702—5 is engaged with the contact 702—6, and a wire 745 extended from the contact 702—5 is connected to the wire 740 so that in a cycle of machine operation in which the relay 700 is operated, circuit will be extended through the switch 685 and the contacts 702—5 and 702—6 and through the switch 745 so as to energize the solenoid 330. Where it is desirable to use the selecting mechanism for other purposes than the control of the print-skip operation, the switch 743 may be opened, and the desired additional controlling function may be obtained connecting such additional means into the circuit at a point along the wire 744.

Thus in respect to the interval control mechanism 400, a wire 747 is extended from the wire 744 to the central contact of the switch 706, and when the interval control mechanism is connected for operation by closure of the switch 706, the circuit is extended from the other contact of the switch by a wire 748 to one terminal of the counting relay 450, the other terminal being connected to the line wire 506 by a wire 749. Hence, operation of the timing relay 700 will under the circumstances just described result in operation of the counting solenoid 450 of the interval counter 400.

The operation of the clutch solenoid 515 of the adding and listing unit is governed by the contacts 702—2 and 702—3 of the timing relay 700, these contacts being engaged when the relay 700 is operated. The contact 702—2 is connected to the wire 745 so that circuit is extended from the wire 507 when the carrier bars 192 allow the switch 685 to be closed. The contact 702—3 is connected by a wire 750 to one stationary contact of the "off-on" switch 705, this switch being used to condition the machine for operation of the printing machine and the adding unit, together, or for operation of the printing machine without operation of the adding and listing unit. Thus, when the movable member of the switch 705 is engaged with a stationary contact 705—1 of this switch, circuit is extended by a wire 752 to the number 7 contact of the connector plug 500. Circuit is extended from the related contact number 7 of the socket 501 by a wire 753 that extends to one terminal of the clutch solenoid 515 of the adding and listing unit, the other terminal of this solenoid being connected by wire 754 to the line wire 506A. Thus under such circumstances, the operation of the timing relay 700 serves to initiate an adding cycle of the adding and listing unit, and the numerical amount sensed from the printing device at sensing station will be added and will be printed on the proof sheet PS. A cycle of operation of the adding unit 41 may also be initiated, when the movable element of the switch 705 is in its "off" position, by a push button switch 755 that has its opposite terminal connected by wires 756 and 757 to the wires 753 and 507A, respectively.

When the movable element of the switch 705 is in its "off" position, thereby to render the adding machine ineffective, it is engaged with a stationary contact 705—2 which is connected by wires 755 and 760 to the contact 702—4 of the timing relay 700. A wire 761 extends from the wire 755 to one contact of the cable restoring switch 187, the other contact of this switch being connected by a wire 762 to the number 3 contact of the plug 501. The other number 3 contact of the socket 501 is connected by a wire 763 to one terminal of the cable restoring solenoid 517, the other terminal of this solenoid being connected by wire 764 to line wire 506A.

When the control switch 730 is set to either its print-tab or skip-tab setting, the operation of the selecting switch 265 is effective in accordance with the sensed presence or absence of tabs on the printing device, and in accordance with the setting of the control switch 730 to cause print-tab or skip-tab operation of the printing mechanism, and whenever a print operation is to be the result of such sensing operation, the solenoid 330 is energized in the storage mechanism and the adding unit 41 is operated through an adding cycle and the interval counter is operated through a counting cycle.

*The total taking and related circuits*

When the interval counter 400 has operated through a sufficient number of interval spaces, as determined by the one of the contacts 707—1 to 707—3 which is connected to the settable contact 707S, it will cause the closure of the particular switch 421 to 423, and this serves to energize the reset solenoid 447 and at the same time to energize the T—1 total relay 640. Thus the settable contact 707S is connected to the line wire 507 by a wire 770, and wires 771—1, 771—2 and 771—3 connect the several contacts 707—1 to 707—3 to one contact of each of the respective switches 421 to 423. The other contacts of these three switches are connected to a common lead wire 772 that extends to one contact of the normally closed switch 460. A branch lead 773 from the wire 772 extends in series with a wire 774 to one contact of the reset solenoid 447, the other terminal of this solenoid being connected by a wire 775 to the line wire 506. Thus, whenever the effective one of the switches 421 to 423 is closed so as to indicate the completion of the desired interval, the reset solenoid 447 will be energized so that the arm 443 may move in a clockwise direction as viewed in Fig. 36. When the solenoid 447 is thus energized, another energizing circuit is extended through the switch 460, which is then closed, and to a wire 778 that extends to the number 2 contact of the plug 500. A wire 779 from the related number 2 contact of the socket 501 extends to the contact 643—13 of the T—1 total relay, this contact being at this time in engagement with the contact 643—14. This contact 643—14 is connected by wire 780 to one terminal of the winding 643 of the T—1 total relay 640, the other terminal of this solenoid being connected by a wire 781 to the line wire 506A.

When the T—1 total relay 640 is thus energized, a holding circuit is afforded therefor, it being noted that the contact 643—14 is separated from the contact 643—13 after and as an incident to the engagement of the contact 643—14 by the contact 643—12. In this make-before-break operation, the energizing circuit for the relay coil 643 is extended to the contact 643—12, which is connected by a wire 783 to one contact of the normally closed switch 614—7. The other contact of this switch 614—7 is connected by a wire 784 to the wire 507A, thereby to complete a holding circuit for the T—1 total relay 640 so long as the switch 614—7 remains closed.

When the T—1 total relay 640 is thus operated, an energizing circuit is completed to the control solenoid 609—1 of the T—1 total control unit. Thus one terminal of the solenoid 609—1 is connected by a wire 785 to the line wire 506A, and wires 786 and 787 are extended in series from the other terminal of the solenoid 609—1 to the contact 643—4 of the relay 640. When the relay 640 is operated, the contact 643—4 will be engaged by contact 643—3, and a wire 788 is extended from this last contact to the contact 654—8 of the T—2 total control relay 650. A branch lead 789 from the wire 788 extends to one contact of a timing switch 790 that is included in the adding and listing unit, this timing switch corresponding to the timing switch 658 shown in my aforesaid copending application. The other terminal of the timing switch 790 is connected by wire 791 to the line wire 507A, and hence when the T—1 total control relay 641 is operated in response to operation of the interval control mechanism 400, the timing switch 790, upon its closure late in the adding cycle that is then in progress, will close circuit to the total control solenoid 609—1. This operation of the solenoid 609—1 releases the shaft 601 for rotation, and early in the cycle of such rotation, the arm 611 will be operated so as to set total control shaft of the adding and listing unit and at the same time release the main clutch of the adding and listing unit so that the machine may operate through a T—1 total cycle.

In the course of operation of the shaft 601 of the total control unit, the stick circuit for the relay 640 remains closed until late in the cycle of rotation of the shaft 601, and at this time the stick circuit is broken by opening of the switch 614—7.

When a T—1 total is to be taken, the proof sheet PS is fed through what is termed a long paper feed, and this is done under control of the solenoid 516, which is energized in the course of rotation of the shaft 601 by closure of the switch 614—4. Thus one terminal of the solenoid 516 is connected by a wire 800 to the line wire 506A and a wire 801 extends from the other terminal of the solenoid 516 and has branch leads 802 and 803 extended to one contact of each of the respective switches 614—4 and 614—2. The other contact of the switch 614—4 is connected by a wire 804 to the contact 653—13, which at this time is engaged with the contact 653—14, and a wire 805 extends from this last mentioned contact to the contact 643—9. The contact 643—9 is at this time engaged with the contact 643—8, which is connected by a wire 806 to the line wire 506—A. Hence, when the rotation of the shaft 601 causes engagement of the switch 614—4, the paper feed solenoid 516 will be energized.

When a total is thus being taken, the operation of the T—1 total control relay 640 is effective to break the holding circuit to the main clutch control solenoid 181 of the printing machine, and this is accomplished by breaking the engagement between the contact 643—7 and the contact 643—6, these normally closed contacts being included in the holding circuit for the solenoid 181 as hereinbefore described. Thus the printing machine is stopped.

When the total taking operation is completed, it is, of course, desirable to again start operation of the printing machine, and this is accomplished by energizing the solenoid 181 under control of the switch 614—5. Thus the circuit extends from the line wire 506 through the wire 725 to one terminal of the solenoid 181, and the wire 724 extends from the other terminal of this solenoid to a wire 810 which extends to the number 5 contact of plug 500. A wire 811 extends from the opposed contact number 5 of the socket 501 and has a branch lead 812 that is connected to one of the contacts of the switch 614—5. A wire 813 extends from the other contact of the switch 614—5 to the contact 643—2. The contact 643—2 is at this time engaged with the contact 643—1, and a wire 814 extends from this last mentioned contact to the contact 653—6 of the T—2 total control relay. This contact is at this time engaged with the contact 653—7, and a wire 815 extends from this contact to the wire 806, this wire being connected to the other line wire 507A, so that the desired energizing circuit for the clutch control solenoid 181 is completed when the switch 614—5 is closed by its cam 613—5. This occurs in such a timed relation that the operation of the printing machine may start while the adding and listing unit is completing its total taking operation. The operation of the mechanism then proceeds under control of the selector mechanism, and totals are taken in accordance with the operation of the interval control mechanism or other control mechanism, as will now be described.

The machine may also be operated to take a print T—2 total, and this is normally governed by tabs on the printing devices which act as hereinbefore described to operate the total control switch 266. When this occurs, the operation of the printing machine is immediately stopped, since the contact 266M that is included in the holding circuit of the solenoid 181 is immediately separated from the stationary contact 266—1. In such actuation of the switch 266, the movable contact 266M is engaged with the other stationary contact 266—2, and this completes an energizing circuit to the T—2 total relay 650. Thus the contact 266—2 is connected by a wire 815 to the number 4 contact of the plug 500, and the related number 4 contact of the socket 501 is connected by a wire 816 to the contact 653—1, a branch lead 817 being extended to one terminal of the coil 653 of the relay 650. The other terminal of this operating coil is connected by a wire 818 to the other side of the circuit as represented by the wire 506A. Thus, when the switch 266 is operated, the relay 650 will be energized, and when this is done, a holding circuit is provided for the relay 650. This holding circuit is afforded by engagement of the contact 653—1 with the contact 653—2, and this last mentioned contact is connected by a wire 820 to the lower contact of the switch 614—1, the other contact of this switch being connected to the other side of the circuit as represented by the wire 507A. Hence the relay 650 will remain energized until the switch 614—1 is opened at the end of the T—2 total taking cycle, as will hereinafter be described in detail.

The operation of the T—2 total relay 650 is effective first to set the T—1 total control shaft 601 in operation so that a T—1 total is printed on the proof sheet PS, and then the T—2 total control relay 650 causes operation of the adding and listing unit to print a T—2 total on the proof sheet. Hence the T-2 total relay must be maintained in its operated condition while both totals are taken, and for this purpose a stick circuit is provided that extends through the contact 653—1 to the contact 653—2 and through a wire 820 to the lower contact of the normally closed, cam opened, switch 614—1, the upper contact of which is connected to the line wire 507A.

It should be observed that such operation of the relay 650 may result from the sensing of an appropriate tab on either a "print" plate or a "skip" plate, and since the circuits differ somewhat in these different conditions, both such circuits will be described. Thus, when the relay 650 is operated due to the sensing of a print plate, the adding and listing unit 41 will, of course, be in operation, and the timing switch 790 will be closed to complete an energizing circuit to the control solenoid 609—1 of the T—1 total control unit. This circuit extends through wire 791, timing switch 790, and wire 789 to a wire 821 that extends to the contact 653—8. The contact 653—8 is then in engagement with the contact 653—9 which is connected by wires 822 and 823 in series to the wire 786, and the wire 786 extends to one terminal of the solenoid 609—1, the other terminal of the solenoid 609—1 being connected to the wire 506A by the wire 785. Thus the solenoid 609—1 is energized.

On the other hand, however, when the relay 650 is operated due to sensing of a skip plate, the adding machine will not be in operation, and the circuit just described will therefore be ineffective to operate the solenoid 609—1. In such an instance, therefore, the timing switch 187 in the printing machine is arranged to cooperate with the then unoperated timing relay 700 and with other contacts in the relay 650 to energize the solenoid 609—1. Thus the wire 823 is connected by a wire 825 to the contact 653—10 which, upon operation of the relay 650, is engaged with the contact 653—11, and a wire 826 extends from this contact to the wire 763. Hence circuit is extended through wires 763 and 762 to the timing switch 187. From the other contact of the switch 187, circuit is extended through wires 761 and 760 to the contact 702—4 of the timing relay, which contact 702—4 is then in its normally engaged relation with the contact 702—5 that is connected by wires 745 and 740, switch 685 and wire 741 to the other line wire 507.

The shaft 601 which is to cause taking of a T—1 total is thus started through its cycle, and since a T—2 total is to be taken after the taking of the T—1 total, the switch 614—5 which would normally operate to again start the printing machine is disabled. Thus the circuit that is normally closed by the switch 614—5 to energize the solenoid 181 includes the switch contacts 653—6 and 653—7, and these contacts are separated when the relay 650 is operated. Hence the switch 614—5 is rendered ineffective.

When the T—2 relay 650 is energized, the switch 614—6 is effective, near the end of the cycle of the shaft 601, to energize the solenoid 609—2 of the T—2 total control unit, and one contact of the switch 614—6 is therefore connected by wires 830 and 831 in series to one terminal of the solenoid 609—2, the other one terminal of which is connected by a wire 832 to the wire 506A. The other contact of the switch 614—6 is connected by a wire 833 to the contact 653—3. This contact 653—3 is engaged with the contact 653—4 when the relay 650 is operated, and a wire 834 connects this last contact with the wire 815 which is connected by the wire 806 to the other line wire 507A.

It will be recalled that the circuit to the paper feed solenoid 516 from the switch 614—4 includes the contacts 653—13 and 653—14, but when the relay 650 is energized, these contacts are separated. Thus the T—1 total will be printed at the regular line space interval, but with respect to the T—2 total, a long space is afforded, and for enabling this to be accomplished, the operation of the relay 650 causes the contact 653—7 to engage the contact 653—5 which is connected by a wire 835 to the lower contact of the switch 614—2. This serves to condition the switch 614—2 for operating the paper feed solenoid 516 in the T—2 total taking cycle. Such a T—2 total taking cycle is initiated by the closure of the switch 614—6 near the end of the cycle of the shaft 601 of the T—1 total control unit.

Hence, as the shaft 600 of the T—2 total control unit starts its movement, the lever 611—2 is actuated to set the total control shaft of the adding and listing unit to its T—2 total control position, while at the same time tripping the main clutch of the adding and listing unit to initiate the T—2 total cycle thereof. The closure of the switch 614—2 causes the desired long feed of the proof sheet, and at the end of the cycle of the shaft 600, the stick circuit of the T—2 relay 650 is broken by opening the switch 614—1, with the result that the machine is stopped.

When a T—2 total has thus been taken, the operator first resets the interval control unit 400 by closing the switch 708, one contact of which is connected by a wire 840 to the wire 774 and the other of which is connected by a wire 841 to the wire 770, thus to be disposed in parallel with the switches 421 to 423. This energizes reset solenoid 447 and causes the unit 400 to be reset to its zero position. The operator may then initiate further automatic operation of the machine by depressing the start switch 710.

The foot switch 662 may be used either to start the printing machine in the same manner as the start switch 710, or to initiate a T—2 total cycle, depending on the setting of the switch 666. Thus when the movable switch member 665 is in its upper position, it connects the wire 664 with a wire 850 that extends to the wire 812, thereby to place the foot switch 662 in parallel with the switch 614—5, and hence the switch 662 will in such an instance be effective to start operation of the printing machine. When the switch arm 665 is in its lower position it extends circuit from the wire 664 to a wire 851 that extends to the wire 831, thereby to place the foot switch 662 in parallel with the switch 614—6. Hence the foot switch 662 will be effective to start the T—2 total control shaft 600 when this is desired.

When the printing machine is to be operated under control of the selector mechanism, but without automatic adding operation of the adding and listing unit, the movable member 705M of the switch 705 is put in its lower position. This connects the contact 705—2 to a wire 855 which extends to the wire 713, thereby to be normally connected to the line wire 507 through the switch 266. Thus circuit is extended through the wire 760, normally closed contacts 702—4 and 702—5, and wires 745 and 739 to the timing switch, and hence when the switch 730 is set to its print-tab or skip-tab position, the timing relay 700 may be normally operated to properly govern the energizing circuits for the solenoids 330 and 330B. The wire 761 similarly extends circuit to the switch 187 so that the sensing cable restoring solenoid 517 will be energized in each cycle.

Conclusion

In the foregoing description it will be evident that the apparatus of the present invention enables documents that include numerical or money items to be produced on a printing machine of a well-known type and in such a way that a proof sheet is produced concurrently with the production of the individual business instruments. The present invention enables the business instruments to be produced from the printing devices selectively so that the printing devices used in producing these business instruments need not be specially selected by hand. Moreover, the apparatus of the present invention enables this selective action of the printing machine to control the action of the related adding unit, thereby to make the proof sheet conform with the business instruments that have been produced selectively from the individual printing devices that are passed through the machine.

It will also be evident that the present invention affords a highly advantageous selector mechanism in that this selector mechanism may be rendered operative to accomplish its selecting function either when the printing machine is being operated alone, or when the printing machine is being operated in conjunction with the adding and listing unit. The mechanism of the present invention is such that the change of the selector mechanism from one of the aforesaid modes of operation to the other may be accomplished in a simple and easy manner.

It will also be evident that the present invention affords a highly advantageous sensing head that is effective to sense perforations in a printing and control device or the like, and is also effective to sense control devices that are used on the printing devices for purposes of selection and the like. More specifically, it will be observed that the present invention affords a sensing mechanism for sensing two different types of representations on a printing device or the like, and that the two independent sensing operations are performed by means that normally move as a unit, but which may have independent movements in the event that the selecting portion of the sensing head is actuated by the sensing of identifying means on the printing device.

It will also be evident that the present invention affords a machine for producing a series of independent business instruments and an associated proof sheet in such a way that totals of the numerical or money amounts included on the individual business instruments may be produced at any one of a large number of different intervals, thereby to adapt the machine for use in a wide variety of different circumstances that may be encountered. More specifically, it will be evident that the number of business instruments included in each total taking operation may be readily and easily changed by the usual operator of the machine, thereby to adapt the machine for use in most types of business establishments.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims:

I claim:

1. In a printing machine of the kind through which printing and control devices, each adapted to bear identifying means at one or more locations thereon and each bearing printing means and data representations, are adapted to be passed one by one to sensing and printing stations in the machine, a sensing head mounted for movement through a sensing stroke toward a printing and control device located at said sensing station, means on said sensing head operable in such a sensing stroke to sense the data representations on such a printing and control device, a secondary sensing frame mounted on said sensing head for movement therewith and for pivotal movement on and with relation to said sensing head, at least one sensing pin mounted on said sensing head in position to sense identifying means carried by such a printing device in a predetermined location, said sensing pin being movable relative to said sensing head when such identifying means are sensed, means on said secondary sensing frame arranged to engage such a sensing pin to impart rocking movement to said sensing frame relative to said sensing head, a settable selector switch operatively connected to said sensing frame for setting movement thereby, and control means including a timing switch in said machine and governed by the setting of said selector switch.

2. In a printing machine having a plurality of operative mechanisms and through which a series of printing devices each adapted to bear identifying means at one or more selected identifying positions thereon are adapted to be advanced past sensing and printing stations, advancing means for advancing such printing device through the machine in a step by step manner such that each printing device comes to rest at sensing and printing stations, a sensing head adapted to have sensing pins of different lengths mounted therein for sensing such identifying means in selected positions on such a printing device located at sensing stations, an arm shiftably mounted on said sensing head adapted to be disposed in different positions in a sensing operation of said sensing head in dependence upon whether an identifying means is sensed by one of such pins and in further dependence upon the length of the effective sensing pin, a selector switch operatively connected to said arm for setting movement thereby to any one of a plurality of set positions in accordance with the position to which said arm is moved, and means operable under control of said selector switch to govern operation of at least certain of said operative mechanisms.

3. In a printing machine having a plurality of operative mechanisms and through which a series of printing devices each adapted to bear identifying means at one or more selected identifying positions thereon are adapted to be advanced past sensing and printing stations, advancing means for advancing such printing device through the machine in a step by step manner such that each printing device comes to rest at sensing and printing stations, a sensing head adapted to have sensing pins of different lengths mounted therein for sensing such identifying means in selected positions on such a printing device located at sensing stations, an arm on said sensing head adapted to be disposed in different positions in a sensing operation of said sensing head in dependence upon whether an identifying means is sensed by one of such pins and in further dependence upon the length of the effective sensing pin, a selector switch operatively connected to said arm for setting movement thereby to any one of a plurality of set positions in accordance with the position to which said arm is moved, governing means operable under control of said selector switch to govern operation of at least certain of said operative mechanisms, and switch means included in said governing means and operable in different positions to reverse the controlling action of said selector switch.

4. In a printing machine having a plurality of operative mechanisms and through which a series of printing devices each adapted to bear identifying means at one or more selected identifying positions thereon are adapted to be advanced past sensing and printing stations, advancing means for advancing such printing device through the machine in a step by step manner such that each printing device comes to rest at sensing and printing stations, a sensing head adapted to have sensing pins of different lengths mounted therein for sensing such identifying means in selected positions on such a printing device located at sensing stations, an arm pivoted on said sensing head for movement relative thereto and adapted to be disposed in different positions in a sensing operation of said sensing head in dependence upon whether an identifying means is sensed by one of such pins and in further dependence upon the length of the effective sensing pin, and means operable under control of said arm to govern operation of at least certain of said operative mechanisms.

5. In a printing machine having a plurality of operative mechanisms and through which a series of printing devices each adapted to bear identifying means at one or more selected identifying positions thereon are adapted to be advanced past sensing and printing stations, advancing means for advancing such printing device through the machine in a step by step manner such that each printing device comes to rest at sensing and printing stations, a sensing head adapted to have sensing pins of different lengths mounted therein for sensing such identifying means in selected positions on such a printing device located at sensing stations, a pivoted transmitting plate mounted on said sensing head and adapted to be disposed over such pins or in a position wherein such pins are exposed for replacement, means for locking said plate in position over said pins, an arm operatively associated with said plate and adapted to be pivoted thereby to different positions in a sensing operation of said sensing head in dependence upon whether an identifying means is sensed by one of such pins and in further dependence upon the length of the effective sensing pin, a selector switch operatively connected to said arm for setting movement thereby to any one of a plurality of set positions in accordance with the position to which said arm is moved, and means operable under control of said selector switch to govern operation of at least certain of said operative mechanisms.

6. In a printing machine through which printing and control devices, each adapted to bear identifying means at one or more locations thereon and each adapted to bear printing means and data representations, are adapted to be passed one by one to sensing and printing stations in the machine, a sensing head mounted for pivotal movement about a first axis through a sensing stroke toward a printing and control device located at said sensing station, a first means on said sensing head at the end remote from said first axis and operable in such a sensing stroke to sense the data representations on such a printing and control device, a secondary sensing frame mounted on said sensing head for normal movement therewith and for pivotal movement with relation to said sensing head and about a second axis parallel to said first means, means on said sensing head for mounting at least one sensing pin in position to sense identifying means carried by such a printing device in a predetermined location and for movement relative to said sensing head when such identifying means are sensed, means on said secondary sensing frame disposed intermediate said axes and arranged to engage such a sensing pin to impart rocking movement to said sensing frame relative to said sensing head, a settable selector switch operatively connected to said sensing frame for setting movement thereby, and control means including a timing switch in said machine and governed by the setting of said selector switch.

7. In a printing machine including a plurality of operative mechanisms and through which machine printing and control devices, each adapted to bear identifying means at one or more locations thereon and each adapted to bear printing means and data representations, are adapted to be passed one by one to sensing and printing stations in the machine, a sensing head mounted for pivotal movement about a first axis through a sensing stroke toward a printing and control device located at said sensing station, a first means on said sensing head at the end remote from said first axis and operable in such a sensing stroke to sense the data representations on such a printing and control device, a secondary sensing frame mounted on said sensing head for normal movement therewith and for pivotal movement with relation to said sensing head and about a second axis parallel to said first means, means on said sensing head for mounting at least one sensing pin in position to sense identifying means carried by such a printing device in a predetermined location and for movement relative to said sensing head when such identifying means are sensed, means on said secondary sensing frame disposed intermediate said axes and arranged to engage such a sensing pin to impart rocking movement to said sensing frame relative to said sensing head, selector control means operatively connected to said sensing frame for setting movement thereby, and governing means for governing operation of at least one of said operative mechanisms and governed by the setting of said selector control means.

8. In a printing machine through which printing and control devices, each adapted to bear identifying means at one or more locations thereon and each adapted to bear printing means and data representations, are adapted to be passed one by one from a supply magazine to sensing and printing stations in the machine, a sensing head mounted for pivotal movement about a first axis through a sensing stroke toward a printing and control device located at said sensing station, a first means on said sensing head at the end remote from said first axis and operable in such a sensing stroke to sense the data representations on such a printing and control device, a secondary sensing frame mounted on said sensing head for movement therewith and for pivotal movement with relation to said sensing head and about a second axis parallel to said first means, means on said sensing head for mounting at least one sensing pin in position to sense identifying means carried by such a printing device in a predetermined location and for movement relative to said sensing head when such identifying means are sensed, means on said secondary sensing frame disposed intermediate said axes and arranged to engage such a sensing pin to impart rocking movement to said sensing frame relative to said sensing head, a selector control arm connected to said sensing frame and extended therefrom in the general direction of said magazine, a settable selector switch operatively connected to the end of said arm for setting movement thereby, control means including a timing switch in said machine and governed by the setting of said selector switch, a second arm pivoted on said frame adjacent to and parallel to said second axis and extended toward said first axis to a position over a point at which such a sensing pin may be mounted in said sensing head so as to be adapted for direct engagement and actuation by such a pin in a sensing operation, a lever connected to and extended in the other direction away from said magazine, and a control switch mounted in the path of said lever for operation thereby when said second arm is actuated by a sensing pin in a sensing operation.

9. In a printing machine having a plurality of operative mechanisms and through which a series of printing devices each adapted to bear identifying means at one or more selected identifying positions thereon are adapted to be advanced past sensing and printing stations, advancing means for advancing such printing device through the machine in a step by step manner such that each printing device comes to rest at sensing and printing stations, a sensing head mounted for movement from a normal position through a sensing stroke and adapted to have sensing pins of different lengths mounted therein for sensing such identifying means in selected positions on such a printing device located at sensing stations, an arm shiftably mounted on said sensing head adapted to be disposed in different positions in a sensing operation of said sensing head in dependence upon whether an identifying means is sensed by one of such pins and in further dependence upon the length of the effective sensing pin, a resilient abutment effective to restore said arm when said sensing head is returned to its normal position, a selector switch operatively connected to said arm for setting movement thereby to any one of a plurality of set positions in accordance with the position to which said arm is moved, and means operable under control of said selector switch to govern operation of at least certain of said operative mechanism.

10. In a printing machine having a plurality of operative mechanisms and through which a series of printing devices each adapted to bear identifying means at one or more selected identifying positions thereon are adapted to be advanced past sensing and printing stations, advancing means for advancing such printing device through the machine in a step by step manner such that each printing device comes to rest at sensing and printing stations, a sensing head arranged for movement through a sensing stroke from a normal position adapted to have sensing pins of different lengths mounted therein for sensing such identifying means in selected positions on such a printing device located at sensing stations, a pivoted transmitting plate mounted on said sensing head and adapted to be disposed over such pins or in a position wherein such pins are exposed for replacement, means for locking said plate in position over said pins, an arm operatively associated with said plate and adapted to be pivoted thereby to different positions in a sensing operation of said sensing head in dependence upon whether an identifying means is sensed by one of such pins and in further dependence upon the length of the effective sensing pin, a resilient abutment disposed in the path of said arm to be engaged thereby as said sensing head moves to its normal position to thereby restore said arm and said plate, a selector switch operatively connected to said arm for setting movement thereby to any one of a plurality of set positions in accordance with the position to which said arm is moved, and means operable under control of said selector switch to govern operation of at least certain of said operative mechanisms.

11. In a printing machine through which printing and control devices, each adapted to bear identifying means at one or more locations thereon and each adapted to bear printing means and data representations, are adapted to be passed one by one from a supply magazine to sensing and printing stations in the machine, a sensing head mounted for pivotal movement about a first axis through a sensing stroke toward a printing and control device located at said sensing station, means for positively actuating said head through sensing and restoring movements, a first means on said sensing head at the end remote from said first axis and operable in such a sensing stroke to sense the data representations on such a printing and control device, a secondary sensing frame mounted on said sensing head for movement therewith and for pivotal movement with relation to said sensing head and about a second axis parallel to said first means from a normal relation to different set positions, means on said sensing head for mounting at least one sensing pin in position to sense identifying means carried by such a printing device in a predetermined location and for movement relative to said sensing head when such identifying means are sensed, means on said secondary sensing frame disposed intermediate said axes and arranged to engage such a sensing pin to impart rocking movement to said sensing frame relative to said sensing head, a selector control arm connected to said sensing frame and extended therefrom in the general direction of said magazine, means acting on said arm in a restoring movement of said head to restore said arm and said sensing frame to their normal relation on said sensing head, a settable selector switch operatively connected to the end of said arm for setting movement thereby, control means including a timing switch in said machine and governed by the setting of said selector switch, a second arm pivoted on said frame adjacent to and parallel to said second axis and extended toward said first axis to a position over a point at which such a sensing pin may be mounted in said sensing head so as to be adapted for direct engagement and actuation by such a pin in a sensing operation, a lever connected to and extended in the other direction away from said magazine, and a control switch mounted in the path of said lever for operation thereby when said second arm is actuated by a sensing pin in a sensing operation.

12. In a machine for producing individual business instruments including numerical amounts and for concurrently producing a proof sheet listing such numerical amounts and periodical totals of such numerical amounts, an adding and listing unit having total control means, a printing unit through which individual printing and control devices, each adapted to bear numerical data representations and identifying means at predetermined locations thereon and each adapted to bear printing means corresponding at least in part with the numerical data representations thereof, are adapted to be passed one by one to sensing and printing positions, impression means at said printing position, sensing means at said sensing position including a first means operable to sense the data representations of a printing and control device and also including a second means operable to sense the identifying means of such a printing device, a selector switch operatively associated with said second means for setting movement to any one of a plurality of set positions in accordance with the sensing operation of said second means, means operable under control of said selector switch to govern operation of said impression means, an interval control unit for governing operation of said total control means of said adding and listing unit, said interval control unit including a constantly driven power source, a cam shaft having a frictional drive connection from said power source, a reset disk on said cam shaft having a reset notch defining a zero position for said cam shaft, a reset pawl adapted to engage said reset notch to set said cam shaft in said zero position, a plurality of cams fixed on said cam shaft and having dwell surfaces throughout substantially their entire periphery in each instance and each having a leading surface with the leading surfaces of the cams disposed in different angular positions about the axis of the cam shaft, individual total switches associated with the respective cams and adapted for closure by said leading surfaces of said cams, a toothed ratchet wheel fixed on said cam shaft, an escapement mechanism cooperating with said ratchet wheel for imparting step by step advance movement to said cam shaft, electrically operated means governed by said selector switch for actuating said escapement mechanism and said reset pawl, electrically operated reset means acting on said escapement mechanism and said reset pawl to release said escapement mechanism and cause return of said cam shaft to its zero position, circuit means associated with the respective total switches for controlling the total control mechanism of said adding and listing unit, and means for rendering said total switches effective selectively.

13. In a machine for producing individual business instruments including numerical amounts and for concurrently producing a proof sheet listing such numerical amounts and periodical totals of such numerical amounts, an adding and listing unit having total control means, a printing unit through which individual printing and control devices, each adapted to bear numerical data representations and identifying means at predetermined locations thereon and each adapted to bear printing means corresponding at least in part with the numerical data representations thereof, are adapted to be passed one by one to sensing and printing positions, impression means at said printing position, sensing means at said sensing position including a first means operable to sense the data representations of a printing and control device and also including a second means operable to sense the identifying means of such a printing device, a selector switch operatively associated with said second means for setting movement to any one of a plurality of set positions in accordance with the sensing operation of said second means, means operable under control of said selector switch to govern operation of said impression means, an interval control unit for governing operation of said total control means of said adding and listing unit, said interval control unit including a constantly driven power source, a cam shaft having a frictional drive connection from said power source, a reset disk on said cam shaft having a reset notch defining a zero position for said cam shaft, a reset pawl adapted to engage said reset notch to set said cam shaft in said zero position, a plurality of cams fixed on said cam shaft and having dwell surfaces throughout substantially their entire periphery in each instance and each having a leading surface with the leading surfaces of the cams disposed in different angular positions about the axis of the cam shaft, individual total switches associated with the respective cams and adapted for closure by said leading surfaces of said cams, a toothed ratchet wheel fixed on said cam shaft, an escapement mechanism cooperating with said ratchet wheel for imparting step by step advance movement to said cam shaft, a first electrically operated means governed by said selector switch for actuating said escapement mechanism and said reset pawl, a second electrically operated reset means governed by any one of said total switches and acting on said escapement mechanism and said reset pawl to release said escapement mechanism and cause return of said cam shaft to its zero position, circuit means associated with the respective total switches for controlling the total control mechanism of said adding and listing unit, means for rendering said total switches effective selectively, and a disabling switch operated to open position by said second electrically operated means.

14. In a machine for producing individual business instruments including numerical amounts and for concurrently producing a proof sheet listing such numerical amounts and periodical totals of such numerical amounts, an adding and listing unit having total control means, a printing unit through which individual printing and control devices, each adapted to bear numerical data representations and identifying means at predetermined selected locations thereon and each adapted to bear printing means corresponding at least in part with the numerical data representations thereof, are adapted to be passed one by one to sensing and printing positions, impression means at said sensing position including a first means operable to sense the data representations of a printing and control device and also including a second means operable to sense the identifying means of such a printing device, a selector switch operatively associated with said second means for setting movement to any one of a plurality of set positions in accordance with the sensing operation of said second means, means operable under control of said selector switch to govern operation of said impression means, an interval control unit for governing operation of said total control means of said adding and listing unit, said interval control unit including a constantly driven power source, a cam shaft having a frictional drive connection from said power source, a reset disk on said cam shaft having a reset notch defining a zero position for said cam shaft, a reset pawl adapted to engage said reset notch to set said cam shaft in said zero position, a plurality of cams fixed on said cam shaft and having dwell surfaces throughout substantially their entire periphery in each instance and each having a leading surface with the leading surfaces of the cams disposed in different angular positions about the axis of the cam shaft, individual total switches associated with the respective cams and adapted to closure by said leading surfaces of said cams, a toothed ratchet wheel fixed on said cam shaft, an escapement mechanism cooperating with said ratchet wheel for imparting step by step advance movement to said cam shaft, a first electrically operated means governed by said selector switch for actuating said escapement mechanism, electrically operated reset means governed by any one of said total switches and acting on said escapement mechanism and said reset pawl to release said escapement mechanism and cause return of said cam shaft to its zero position, circuit means associated with the respective total switches for controlling the total control mechanism of said adding and listing unit, means for rendering said total switches effective selectively, and a switch in said circuit means adapted to be opened by said electrically operated reset means and to be closed under control of said first electrically operated means.

15. In an interval control unit for governing operation of the total control means of an adding and listing unit, a constantly driven power source, a cam shaft having a frictional drive connection from said power source, a reset disk on said cam shaft having a reset notch defining a zero position for said cam shaft, a reset pawl adapted to engage said reset notch to set said cam shaft in said zero position, a plurality of cams fixed on said cam shaft and having dwell surfaces throughout substantially their entire periphery in each instance and each having a leading surface with the leading surfaces of the cams disposed in different angular positions about the axis of the cam shaft, individual switches associated with the respective cams and adapted for closure by said leading surfaces of said cams, a toothed ratchet wheel fixed on said cam shaft, an escapement mechanism cooperating with said ratchet wheel for imparting step by step advance movement to said cam shaft, electrically operated means for actuating said escapement mechanism and said reset pawl, electrically operated reset means acting on said escapement mechanism and said reset pawl to release said escapement mechanism and cause return of said cam shaft to its zero position, circuit means associated with the respective switches for controlling the total control mechanism of an adding and listing unit, and means for rendering said switches effective selectively.

16. In a machine for producing individual business instruments including numerical amounts and for concurrently producing a proof sheet listing such numerical amounts and totals thereof, an adding and listing unit, a printing unit through which individual printing and control devices, each adapted to bear numerical data representations and identifying means at predetermined selected positions thereon and each adapted to bear printing means corresponding at least in part with the numerical data representations thereof, are adapted to be passed one by one to sensing and printing positions, impression means at said printing position, sensing means at said sensing position including a first means operable to sense the data representations of a printing and control device, transmitting means operable by said first means to set up said adding and listing unit in accordance with the data representations sensed, said sensing means including a second means operable to sense the identifying means of such a printing and control device, a selector switch operatively associated with said second means for setting movement thereby to print or skip positions, operating means for said impression means including a clutch, means governed by the setting of said selector switch to control the operation of said clutch when the related printing device reaches printing position to thereby attain selector controlled print-skip operation of said impression means, means governed by said selector switch for initiating adding operation of said adding and listing unit whenever said selector switch is set in its print position, means operable to restore said transmitting means under control of said adding and listing unit when said adding and listing unit is operated through an adding operation and under control of said printing unit when said selector switch has been set to its skip position.

17. In a machine for producing individual business instruments including numerical amounts and for concurrently producing a proof sheet listing such numerical amounts and totals thereof, an adding and listing unit, a printing unit through which individual printing and control devices, each adapted to bear numerical data representations and identifying means at predetermined selected positions thereon and each adapted to bear printing means corresponding at least in part with the numerical data representations thereof, are adapted to be passed one by one to sensing position and then through at least one idle station and into a printing position, impression means at said printing position, printing device advancing means operable to move such devices step by step between said positions, sensing means at said sensing position operated by said advancing means and including a first means operable to sense the data representations of a printing and control device, transmitting means operable by said first means to set up said adding and listing unit in accordance with the data representations sensed, said sensing means including a second means operable to sense the identifying means of such a printing and control device, a selector switch operatively associated with said second means for setting movement thereby to print or skip positions, operating means for said impression means including a clutch, a storage drum operated by said advancing means and including a plurality of settable storage elements, electrically operated means governed by the setting of said selector switch to set said storage elements in accordance with the setting of said selector switch, clutch control means operated by said storage elements when in set position to control the operation of said clutch when the related printing device reaches printing position to thereby attain selector controlled print-skip operation of said impression means, means governed by said selector switch for initiating adding operation of said adding and listing unit whenever said se-lector switch is set in its print position, means operable to restore said transmitting means under control of said adding and listing unit when said adding and listing unit is operated through an adding operation and under control of said printing unit when said selector switch has been set to its skip position.

18. In a machine for producing individual business instruments including numerical amounts and for concurrently producing a proof sheet listing such numerical amounts and totals thereof, an adding and listing unit, a printing unit through which individual printing and control devices, each adapted to bear numerical data representations and identifying means at predetermined selected positions thereon and each adapted to bear printing means corresponding at least in part with the numerical data representations thereof, are adapted to be passed one by one to sensing position and then through at least one idle station and into a printing position, impression means at said printing position, printing device advancing means operable to move such devices step by step between said positions, sensing means at said sensing position operated by said advancing means and including a first means operable to sense the data representations of a printing and control device, transmitting means operable by said first means to set up said adding and listing unit in accordance with the data representations sensed, said sensing means including a second means operable to sense the identifying means of such a printing and control device, a selector switch operatively associated with said second means for setting movement thereby to print or skip positions, operating means for said impression means including a clutch, a storage drum operated by said advancing means and including a plurality of settable storage elements, electrically operated means governed by the setting of said selector switch to set said storage elements in accordance with the setting of said selector switch, clutch control means operated by said storage elements when in set position to control the operation of said clutch when the related printing device reaches printing position to thereby attain selector controlled print-skip operation of said impression means, an interval counting unit governed by said selector switch for counting the printing devices from which impressions are to be made at printing position, means operable under control of said interval counting unit, means governed by said selector switch for initiating adding operation of said adding and listing unit whenever said selector switch is set in its print position, means operable to restore said transmitting means under control of said adding and listing unit when said adding and listing unit is operated through an adding operation and under control of said printing unit when said selector switch has been set to its skip position, means governed by said interval counting unit for initiating a total operation of said adding and listing unit after a predetermined number of adding operations and for concurrently stopping said printing unit, and means governed by said last mentioned means for again initiating operation of said printing unit.

19. In a machine for producing individual business instruments including numerical amounts and for concurrently producing a proof sheet listing such numerical amounts and totals thereof, an adding and listing unit having total control means, a printing unit through which individual printing and control devices, each adapted to bear numerical data representations and identifying means at predetermined selected positions thereon and each adapted to bear printing means corresponding at least in part with the numerical data representations thereof, are adapted to be passed one by one to sensing position and then through at least one idle station and into a printing position, impression means at said printing position, printing device advancing means operable to move such devices step by step between said positions, sensing means at said sensing position operated by said advancing means and including a first means operable to sense the data representations of a printing and control device, transmitting means operable by said first means to set up said adding and listing unit in accordance with the data representations sensed, said sensing means including a second means operable to sense the identfying means of such a printing and control device, a selector switch operatively associated with said second means for setting movement thereby to print or skip positions, operating means for said impression means including a clutch, a storage drum operated by said advancing means and including a plurality of settable storage elements, electrically operated means governed by the setting of said selector switch to set said storage elements in accordance with the setting of said selector switch, switch means settable to different positions to reverse the print-skip controlling action of said selector switch, clutch control means operated by said storage elements when in set position to control the operation of said clutch when the related printing device reaches printing position to thereby attain selector controlled print-skip operation of said impression means, means governed by said selector switch for initiating adding operation of said adding and listing unit whenever said selector switch is set in its print position, means operable to restore said transmitting means under control of said adding and listing unit when said adding and listing unit is operated through an adding operation and under control of said printing unit when said selector switch has been set to its skip position.

WALTER T. GOLLWITZER.

No references cited.